US011922284B1

(12) United States Patent
Pirozzi et al.

(10) Patent No.: US 11,922,284 B1
(45) Date of Patent: Mar. 5, 2024

(54) TEMPORALLY DYNAMIC PREDICTIVE DATA ANALYSIS

(71) Applicant: Liberty Mutual Insurance Company, Boston, MA (US)

(72) Inventors: Timothy Jonathan Pirozzi, Rochester, NH (US); Peter William Dowling, Boston, MA (US); Amarnauth Sukhu, Durham, NH (US); Peter Alexander Salem, Jr., Somerville, MA (US); Ryan Patrick O'Neill, Haverhill, MA (US); Lindsey Marie Marley, Merrimack, NH (US)

(73) Assignee: LIBERTY MUTUAL INSURANCE COMPANY, Boston, MA (US)

( * ) Notice: Subject to any disclaimer, the term of this patent is extended or adjusted under 35 U.S.C. 154(b) by 868 days.

(21) Appl. No.: 16/446,767

(22) Filed: Jun. 20, 2019

Related U.S. Application Data

(60) Provisional application No. 62/687,468, filed on Jun. 20, 2018.

(51) Int. Cl.
*G06N 20/20* (2019.01)
*G06N 5/02* (2023.01)
*G06N 5/04* (2023.01)

(52) U.S. Cl.
CPC ............ *G06N 20/20* (2019.01); *G06N 5/02* (2013.01); *G06N 5/04* (2013.01)

(58) Field of Classification Search
None
See application file for complete search history.

(56) References Cited

U.S. PATENT DOCUMENTS

| | | | |
|---|---|---|---|
| 8,386,280 | B2 | 2/2013 | Mathai et al. |
| 2007/0221743 | A1 | 9/2007 | Weinzapfel et al. |
| 2014/0058783 | A1 | 2/2014 | Modi et al. |
| 2017/0039307 | A1 | 2/2017 | Koger et al. |
| 2017/0301030 | A1 | 10/2017 | Wedig et al. |
| 2018/0190132 | A1 | 7/2018 | Cronkhite et al. |

OTHER PUBLICATIONS

Spentzouris, et al., A Stochastic Optimization Framework for Personalized Location-Based Mobile Advertising, 2017 15th International Symposium on Modeling and Optimization in Mobile, Ad Hoc, and Wireless Networks (WiOpt), 2017, pp. 1-8 (Year: 2017).*
Danaipat, Human Mobility Modeling and Predictive Analysis, Osaka University, 2016, pp. 1-83 (Year: 2016).*

\* cited by examiner

*Primary Examiner* — Wilbert L Starks
(74) *Attorney, Agent, or Firm* — ALSTON & BIRD LLP

(57) ABSTRACT

There is a need for solutions that generates a temporally dynamic prediction for a particular prediction input. This need can be addressed by, for example, processing the prediction input using each of a plurality of temporally trained machine learning models to generate a corresponding model-specific prediction inference of a plurality of model-specific prediction inferences and processing the plurality of model-specific prediction inferences using an ensemble model to generate the temporally dynamic prediction for the prediction input.

13 Claims, 15 Drawing Sheets

TEMPORALLY DYNAMIC PREDICTIVE DATA ANALYSIS

CROSS-REFERENCES TO RELATED APPLICATIONS

This application claims priority to the U.S. Provisional Patent Application No. 62/687,468, filed Jun. 20, 2018, which is incorporated herein in its entirety.

BACKGROUND

Various embodiments of the present invention address technical challenges related to performing predictive data analysis when using non-sequential temporal data. Existing predictive data analysis systems are ill-suited to efficiently and reliably perform predictive data analysis using non-sequential temporal data. Various embodiments of the present address the shortcomings of the noted existing predictive data analysis systems and disclose various techniques for efficiently and reliably performing predictive data analysis on non-sequential temporal data.

BRIEF SUMMARY

In general, embodiments of the present invention provide methods, apparatus, systems, computing devices, computing entities, and/or the like for temporally dynamic predictive data analysis. Certain embodiments utilize systems, methods, and computer program products that enable entity sensitivity classification by using temporally dynamic predictive inferences. Various embodiments of the disclosed techniques enable predictive data analysis by using temporally trained machine learning models, real-time ensemble models, and/or trend-based predictive data analysis frameworks that utilize temporally dynamic techniques. Various embodiments of the disclosed techniques enable predicting property damage prediction and/or service center operational load prediction based on historic training data as well as recent (e.g., real-time) validation data.

In accordance with one aspect, a method is provided. In one embodiment, the method comprises: processing the prediction input using each temporally trained machine learning model of a plurality of temporally trained machine learning models to generate a corresponding model-specific prediction inference of a plurality of model-specific prediction inferences, wherein: (i) each temporally trained machine learning model of the plurality of temporally trained machine learning models is associated with a temporal unit, (ii) each temporal unit for a temporally trained machine learning model of the plurality of temporally trained machine learning models comprises one or more time intervals, and (iii) each temporally trained machine learning model of the plurality of temporally trained machine learning models is trained using one or more temporally distinct training data entries associated with the temporal unit for the temporally trained machine learning model; and processing the plurality of model-specific prediction inferences using an ensemble model to generate the temporally dynamic prediction for the prediction input.

In accordance with another aspect, a computer program product is provided. The computer program product may comprise at least one computer-readable storage medium having computer-readable program code portions stored therein, the computer-readable program code portions comprising executable portions configured to: process the prediction input using each temporally trained machine learning model of a plurality of temporally trained machine learning models to generate a corresponding model-specific prediction inference of a plurality of model-specific prediction inferences, wherein: (i) each temporally trained machine learning model of the plurality of temporally trained machine learning models is associated with a temporal unit, (ii) each temporal unit for a temporally trained machine learning model of the plurality of temporally trained machine learning models comprises one or more time intervals, and (iii) each temporally trained machine learning model of the plurality of temporally trained machine learning models is trained using one or more temporally distinct training data entries associated with the temporal unit for the temporally trained machine learning model; and process the plurality of model-specific prediction inferences using an ensemble model to generate the temporally dynamic prediction for the prediction input.

In accordance with yet another aspect, an apparatus comprising at least one processor and at least one memory including computer program code is provided. In one embodiment, the at least one memory and the computer program code may be configured to, with the processor, cause the apparatus to: process the prediction input using each temporally trained machine learning model of a plurality of temporally trained machine learning models to generate a corresponding model-specific prediction inference of a plurality of model-specific prediction inferences, wherein: (i) each temporally trained machine learning model of the plurality of temporally trained machine learning models is associated with a temporal unit, (ii) each temporal unit for a temporally trained machine learning model of the plurality of temporally trained machine learning models comprises one or more time intervals, and (iii) each temporally trained machine learning model of the plurality of temporally trained machine learning models is trained using one or more temporally distinct training data entries associated with the temporal unit for the temporally trained machine learning model; and process the plurality of model-specific prediction inferences using an ensemble model to generate the temporally dynamic prediction for the prediction input.

BRIEF DESCRIPTION OF THE DRAWINGS

Figure 1:
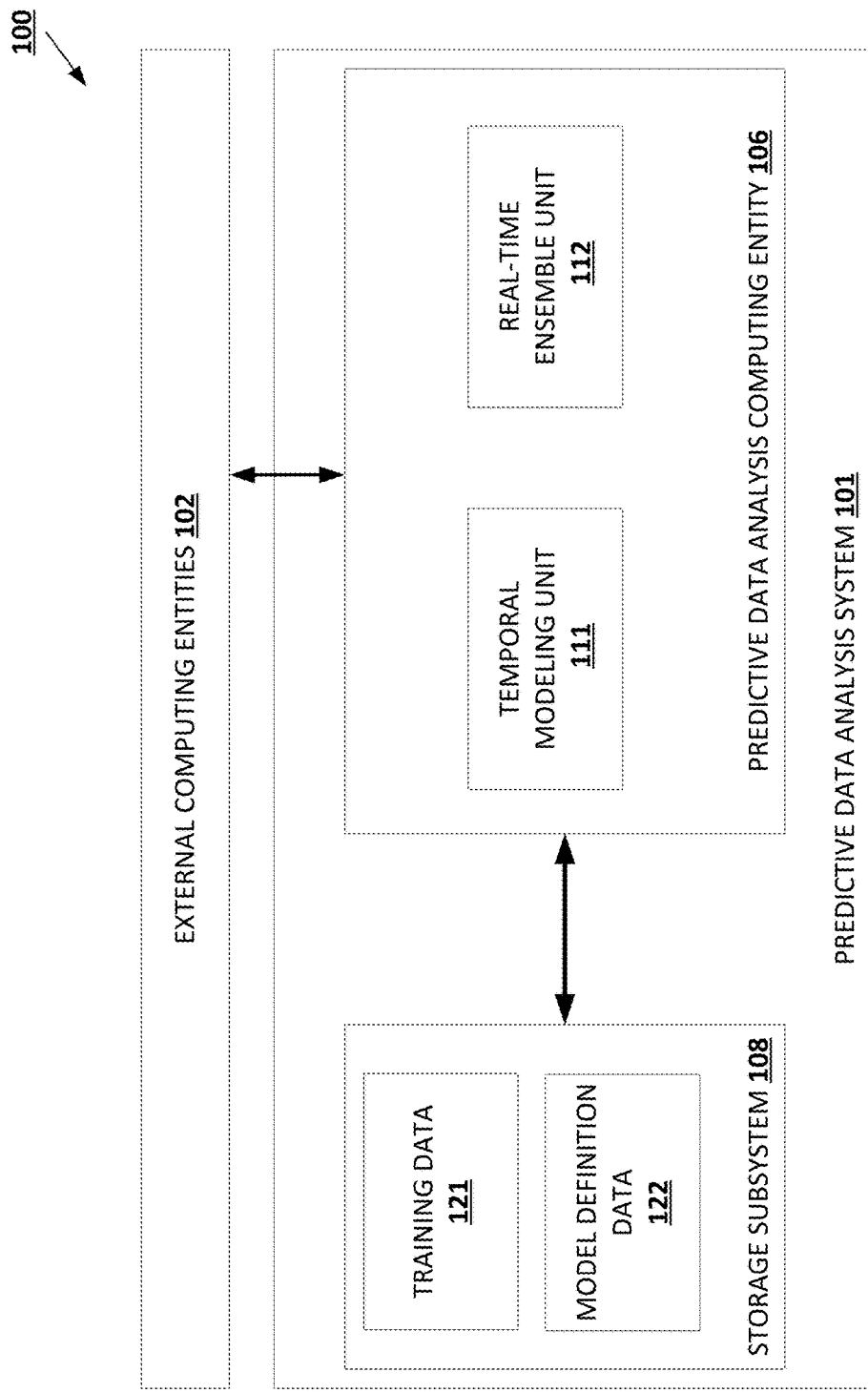

Having thus described the invention in general terms, reference will now be made to the accompanying drawings, which are not necessarily drawn to scale, and wherein:

FIG. 1 provides an exemplary overview of an architecture that can be used to practice embodiments of the present invention.

Figure 2:
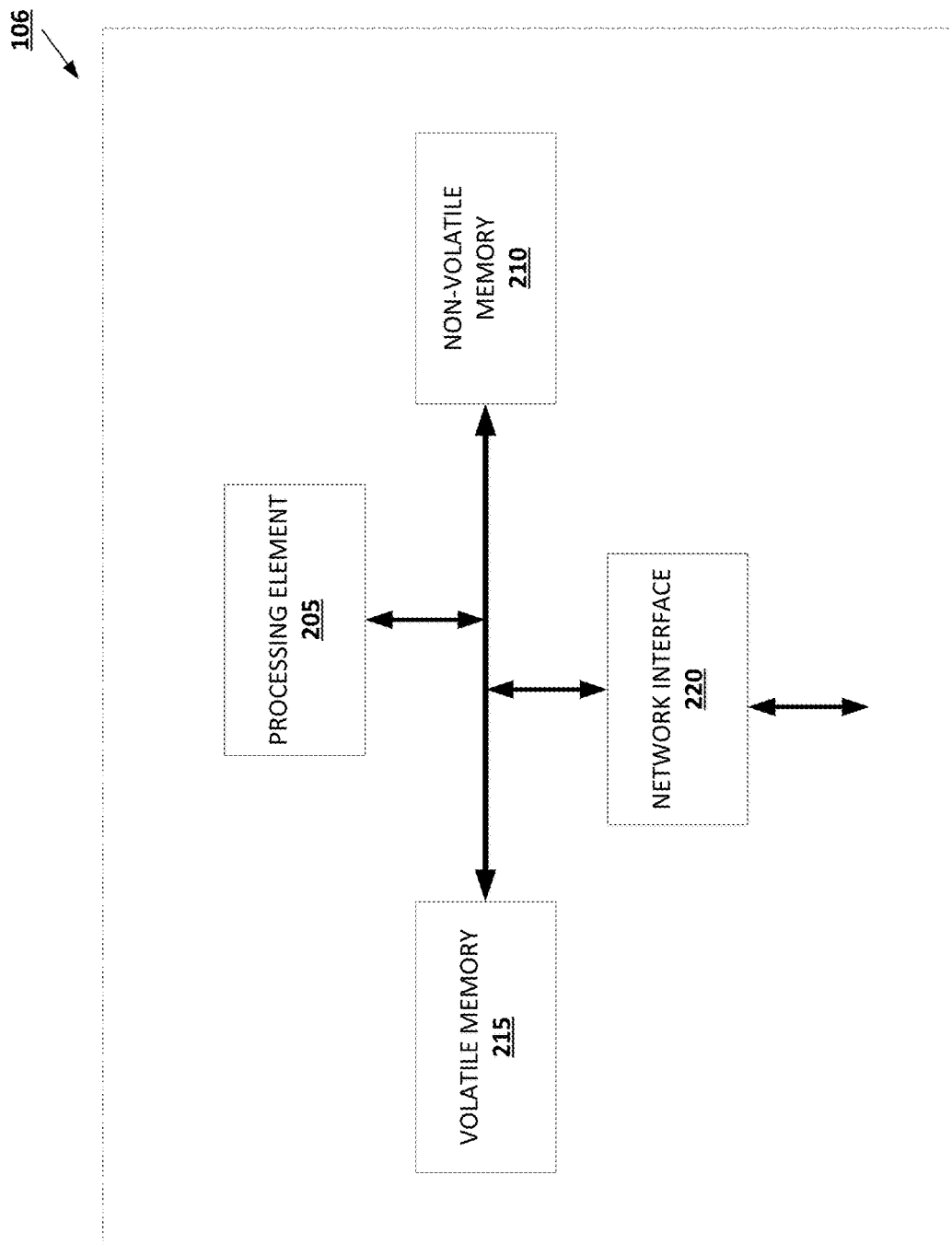

FIG. 2 provides an example predictive data analysis computing entity in accordance with some embodiments discussed herein.

Figure 3:
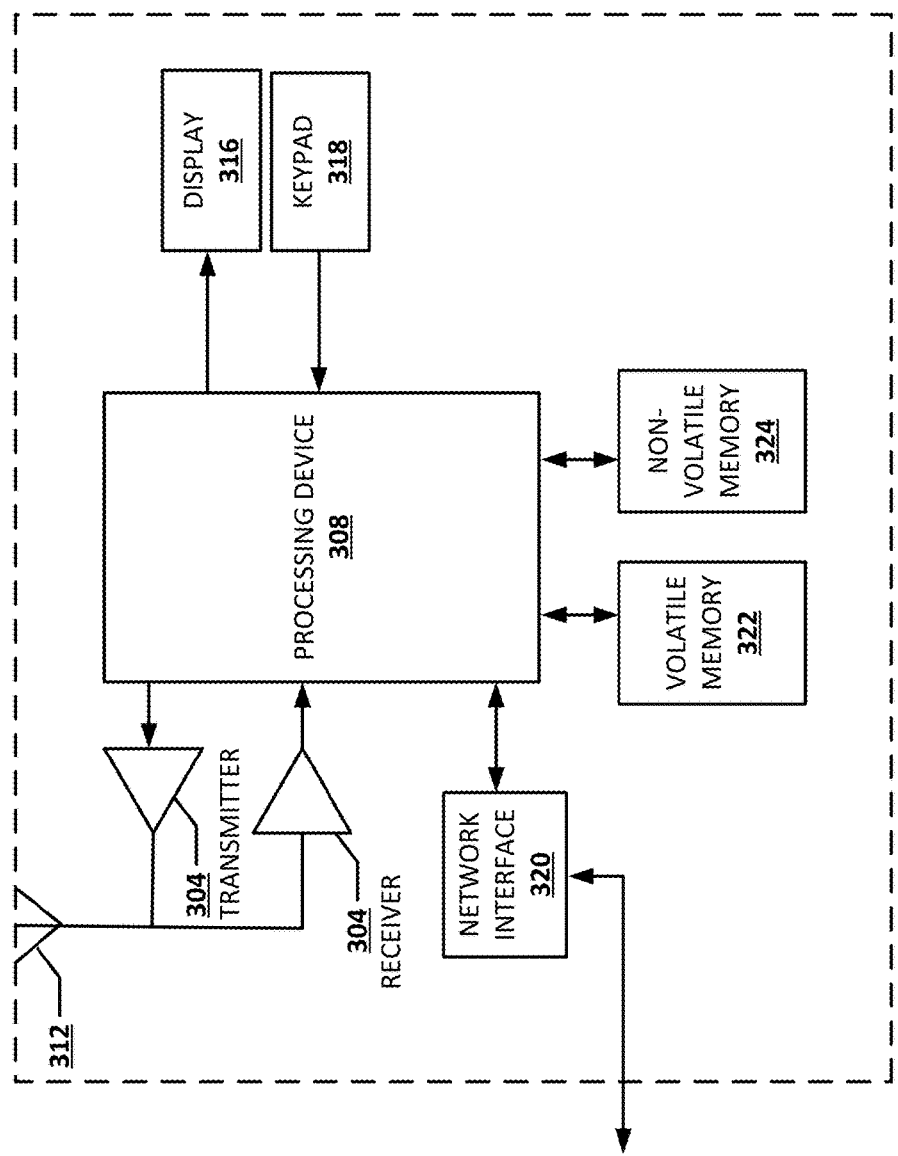

FIG. 3 provides an example external computing entity in accordance with some embodiments discussed herein.

Figure 4:
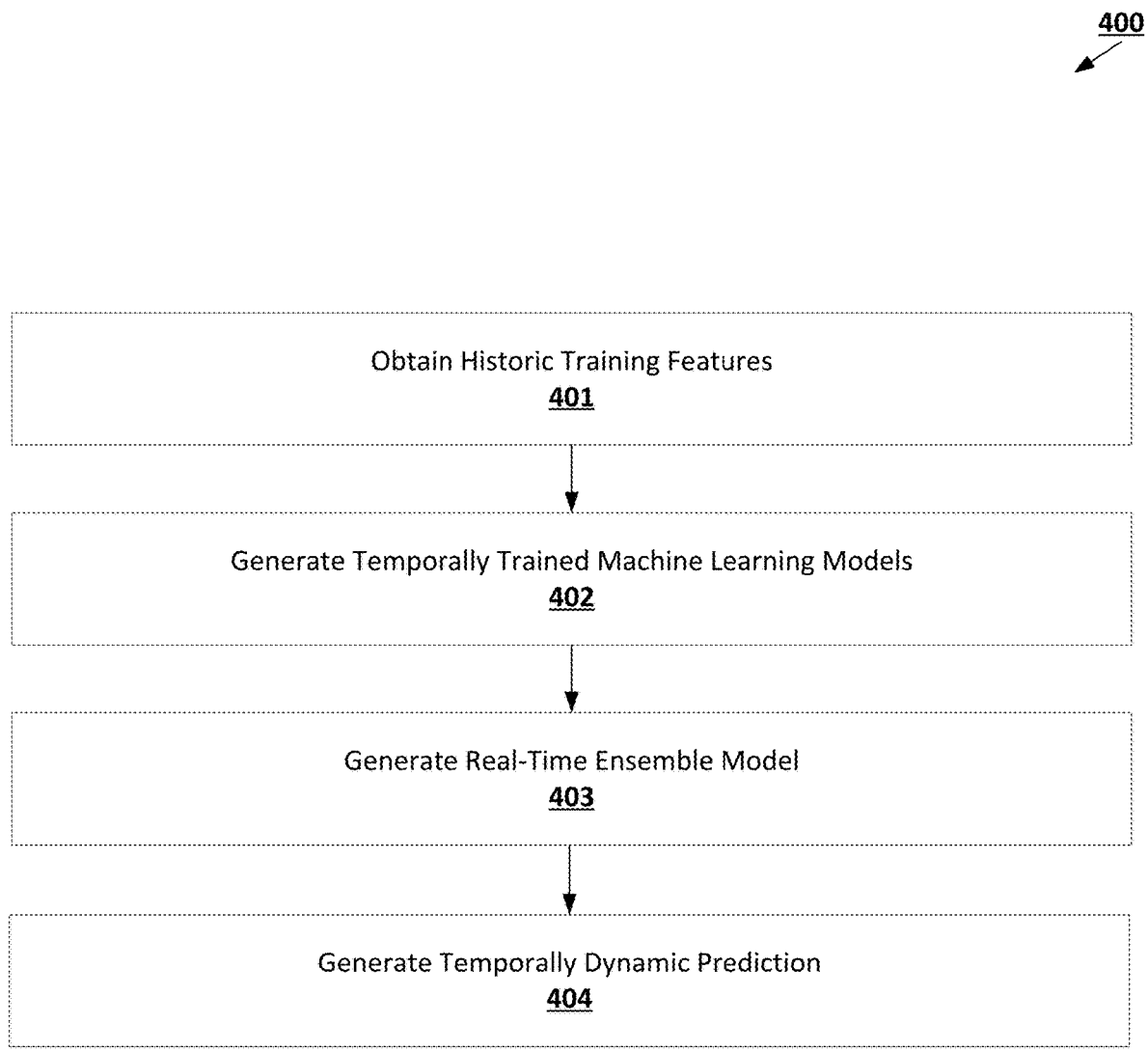

FIG. 4 is a data flow diagram of a process for generating a temporally dynamic prediction based on historic training inputs and real-time training inputs in accordance with some embodiments discussed herein.

Figure 5:
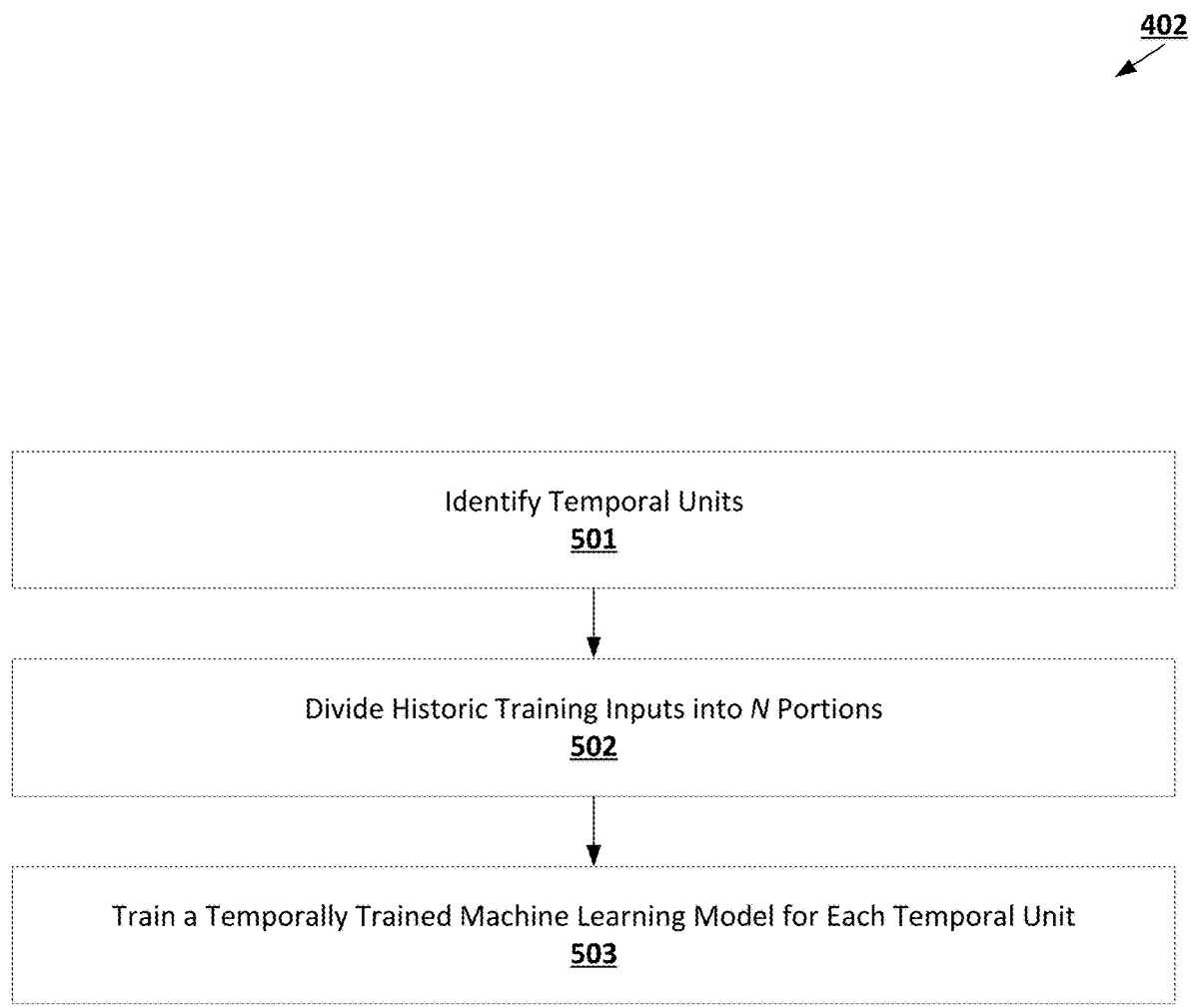

FIG. 5 is a flowchart diagram of a process for generating temporally trained machine learning models in accordance with some embodiments discussed herein.

Figure 6:
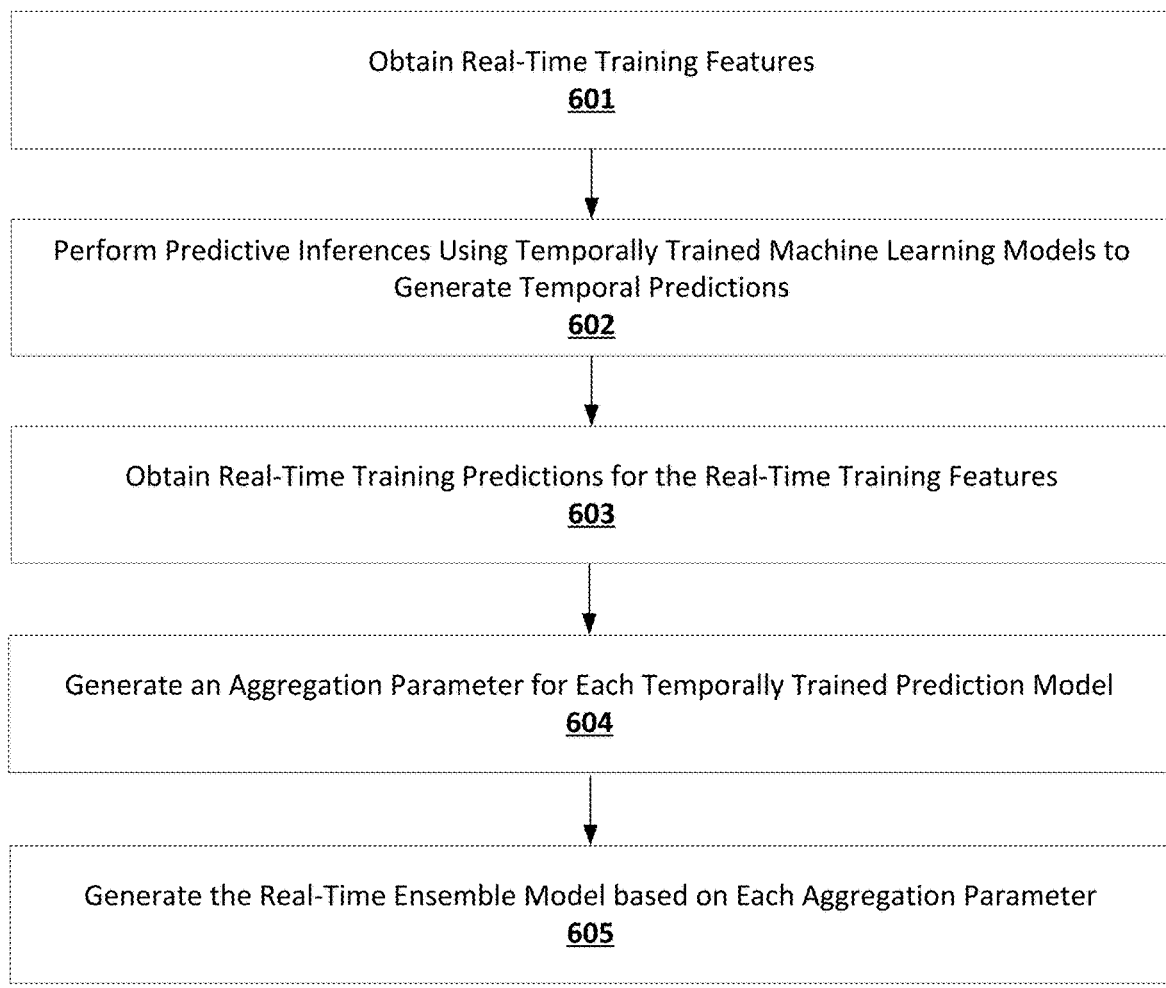

FIG. 6 is a flowchart diagram of a process for generating a real-time ensemble model in accordance with some embodiments discussed herein.

Figure 7:
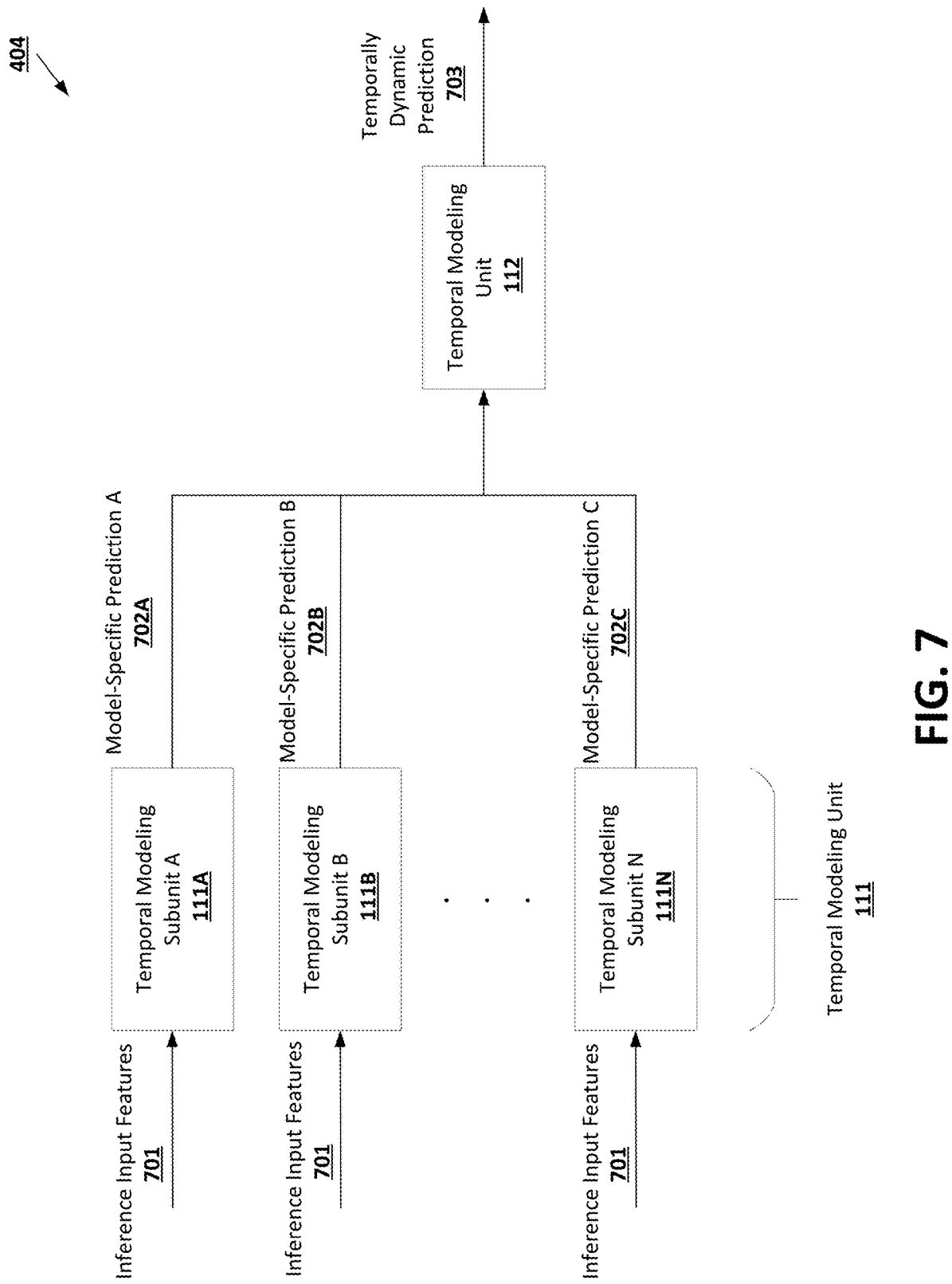

FIG. 7 is a data flow diagram of an example process for generating temporally dynamic predictions in accordance with some embodiments discussed herein.

Figure 8:
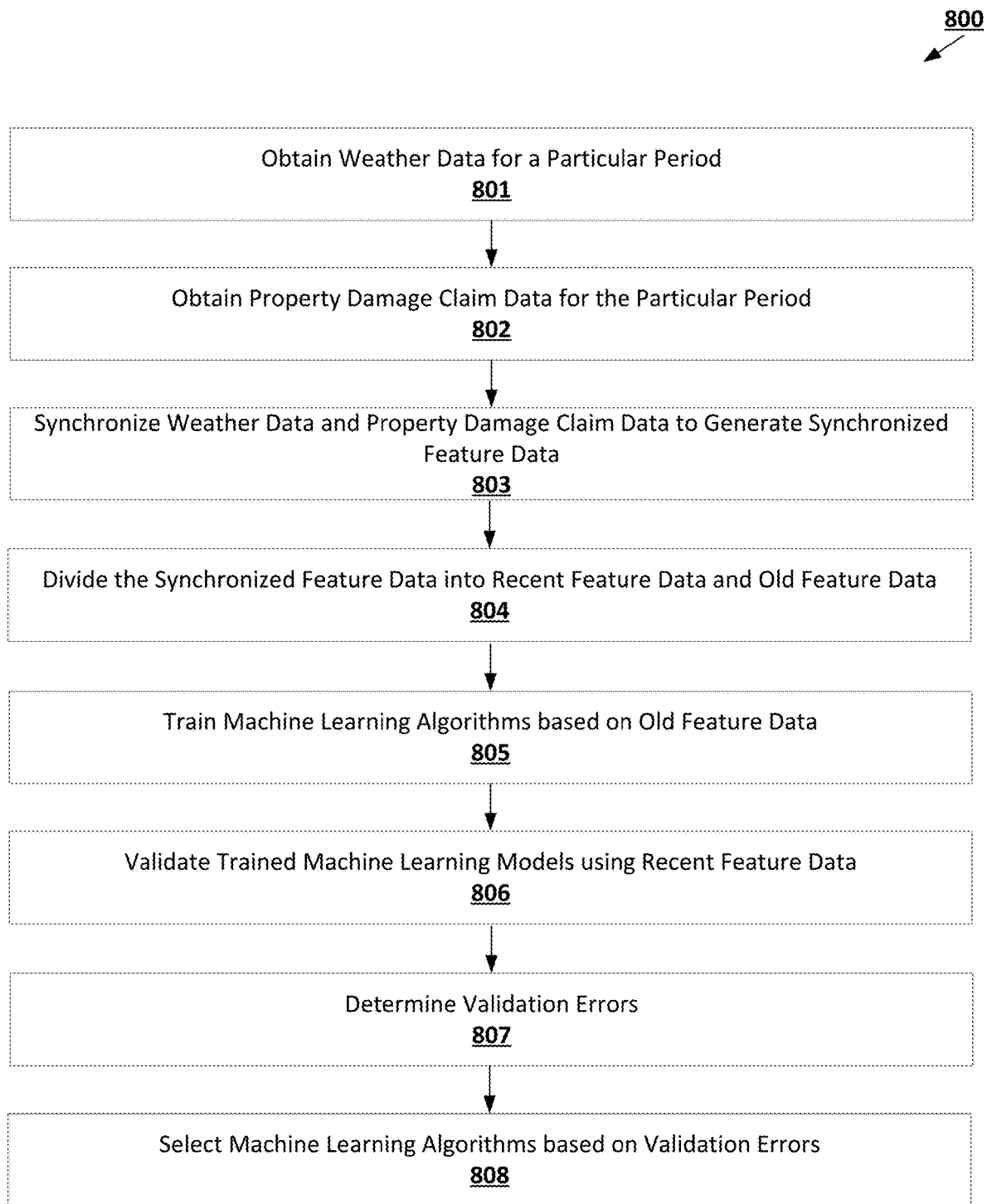

FIG. 8 is a flowchart diagram of an example process for selecting a machine learning algorithm suitable for property damage and operational load prediction in accordance with some embodiments discussed herein.

Figure 9:
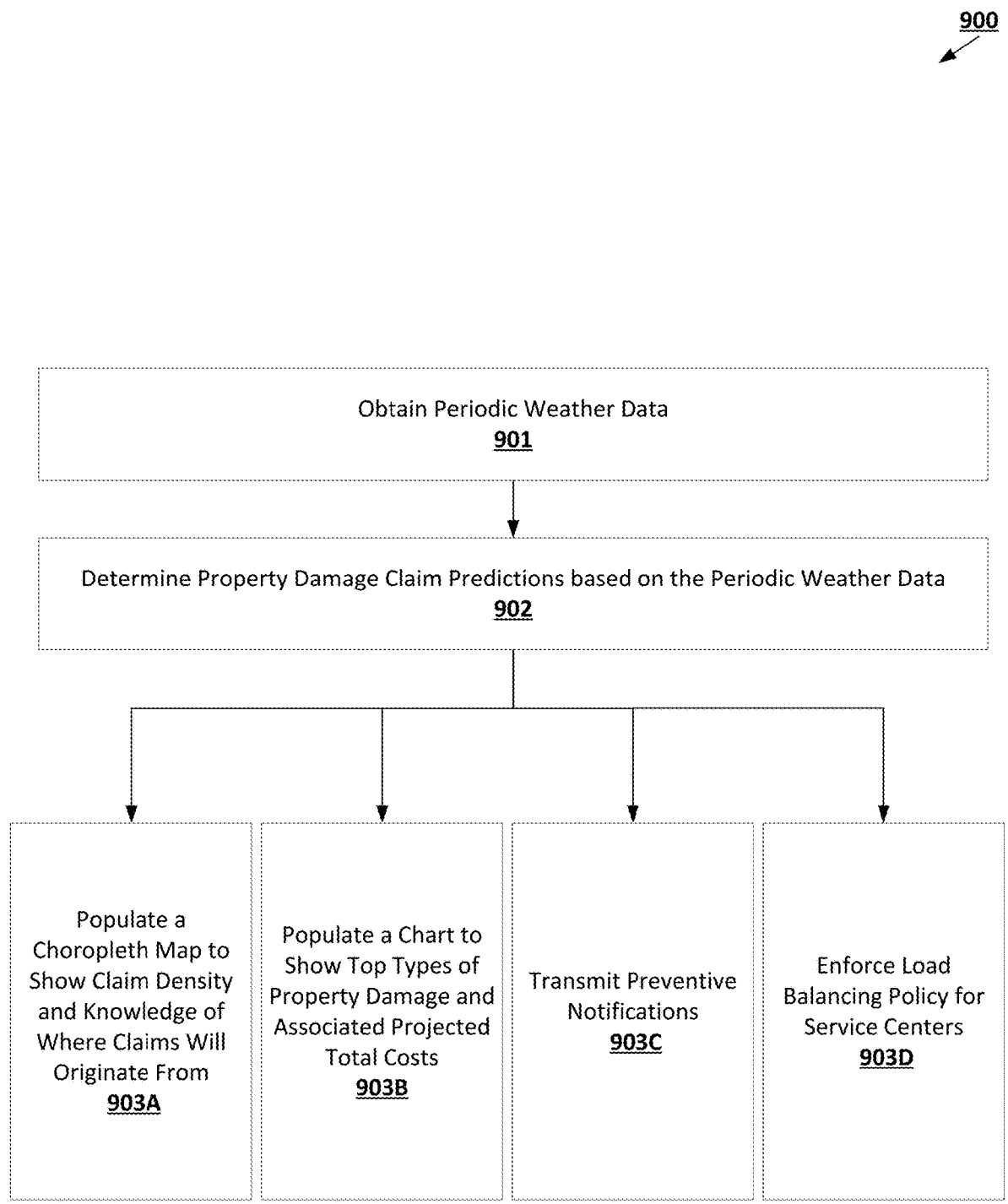

FIG. 9 is a flowchart diagram of an example process for performing prediction-based actions based on temporally dynamic predictions in accordance with some embodiments discussed herein.

Figure 10:
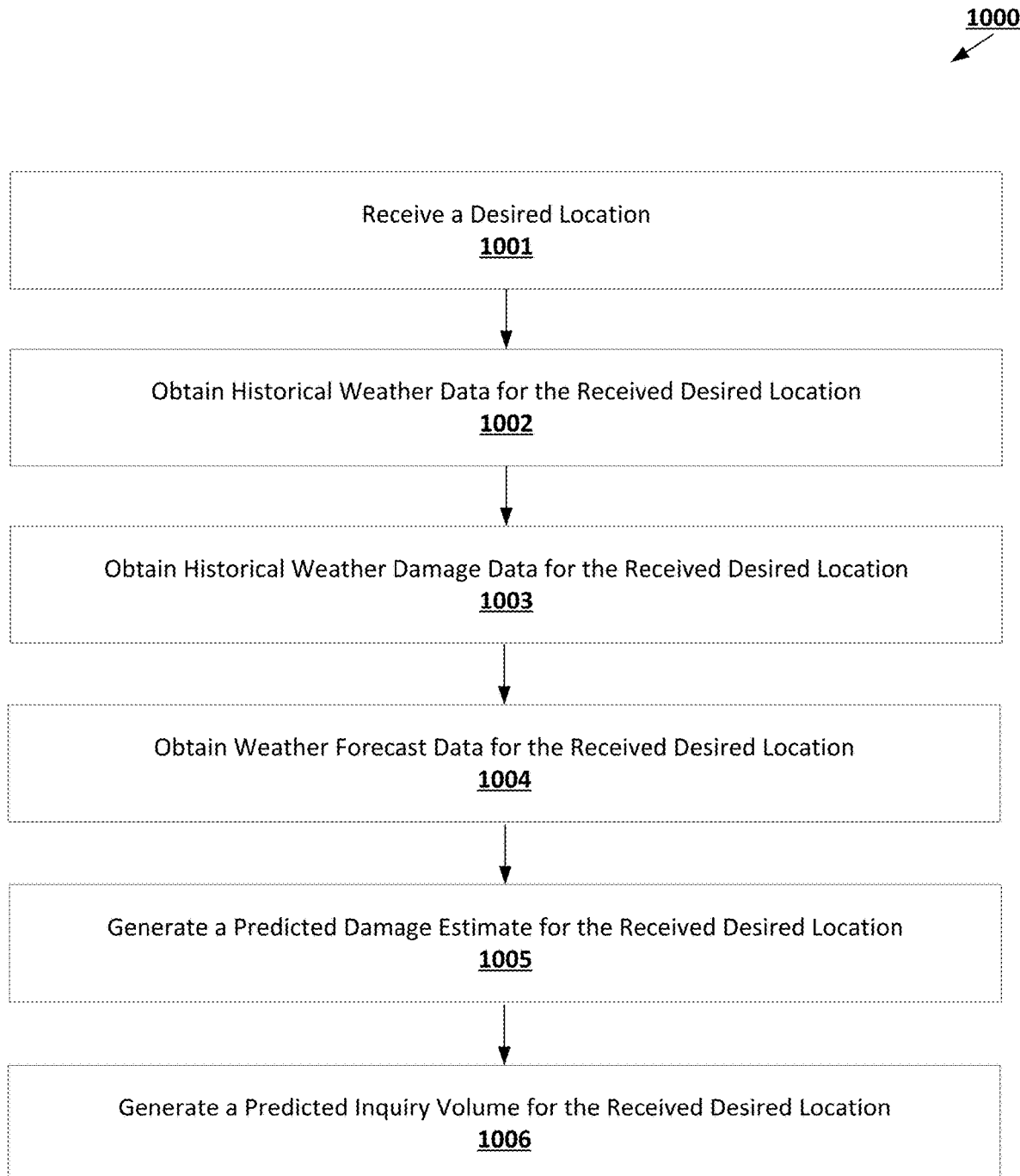

FIG. 10 is a flowchart diagram of an example process for generating a predicted inquiry quantity for a particular location in accordance with some embodiments discussed herein.

Figure 11:
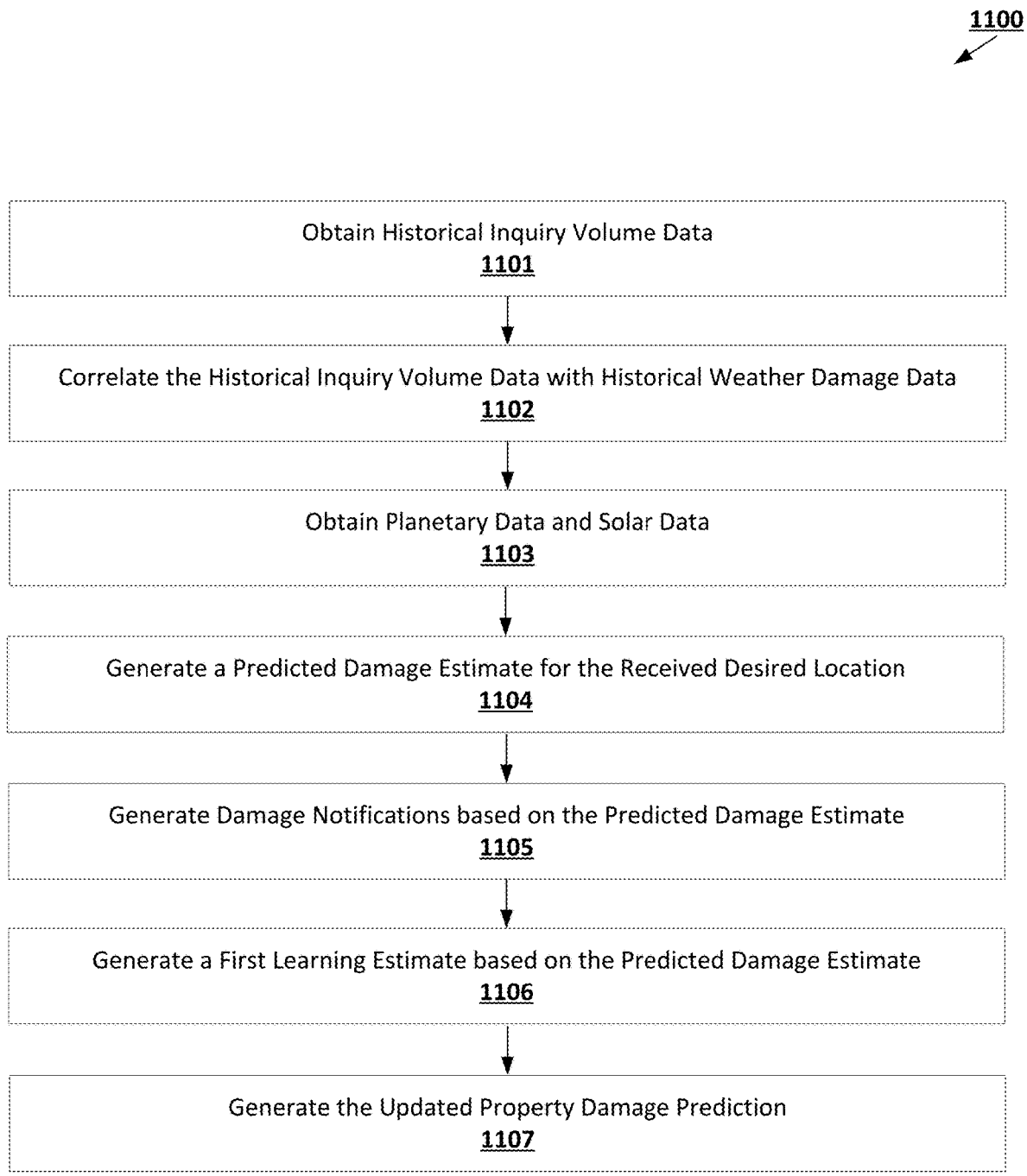

FIG. 11 is a flowchart diagram of an example process for generating an updated property damage prediction model using real-time property damage feedback in accordance with some embodiments discussed herein.

Figure 12:
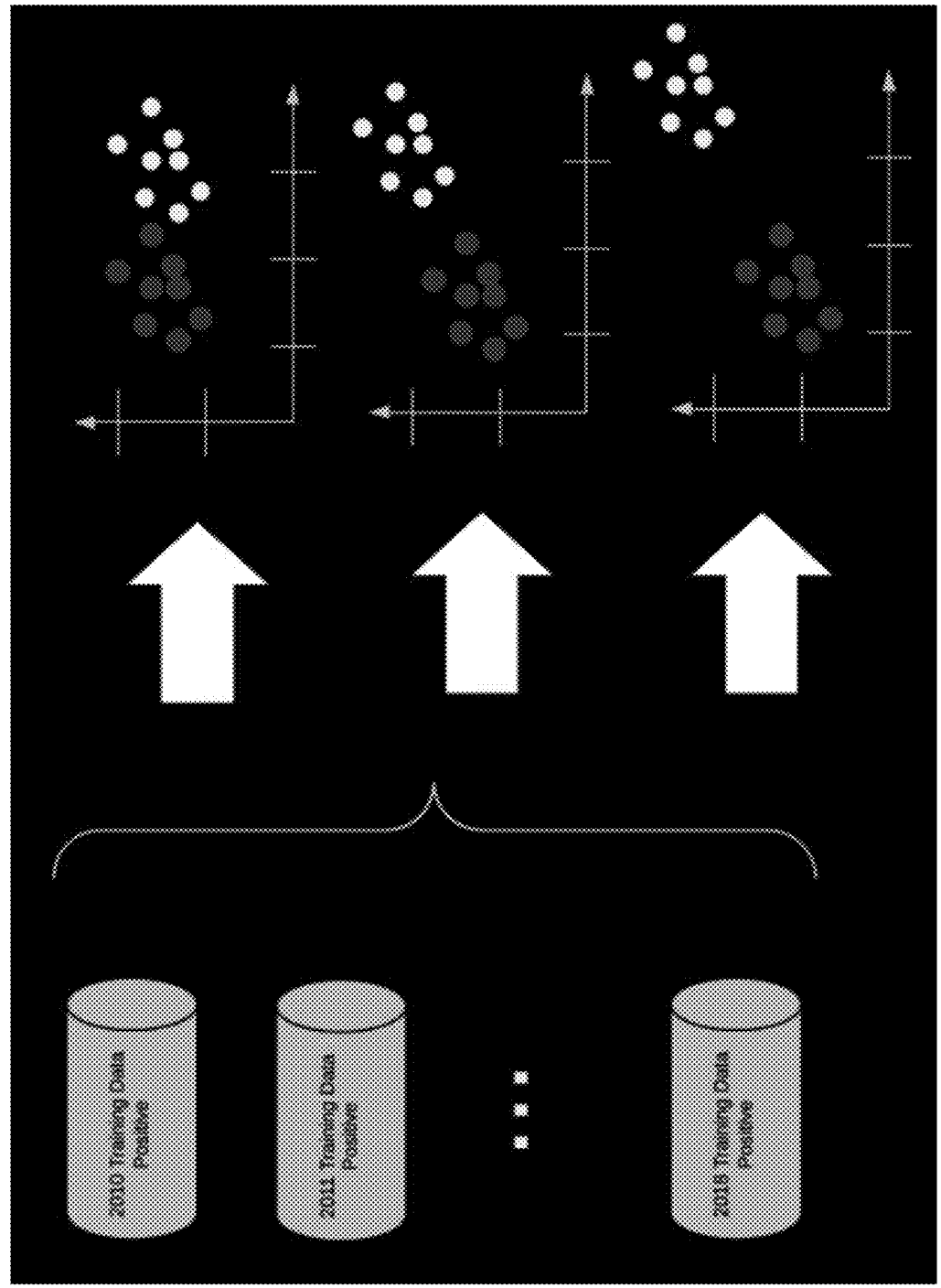

FIG. 12 provides an operational example of trend-based predictive modeling with temporally dynamic techniques in accordance with some embodiments discussed herein.

Figure 13:
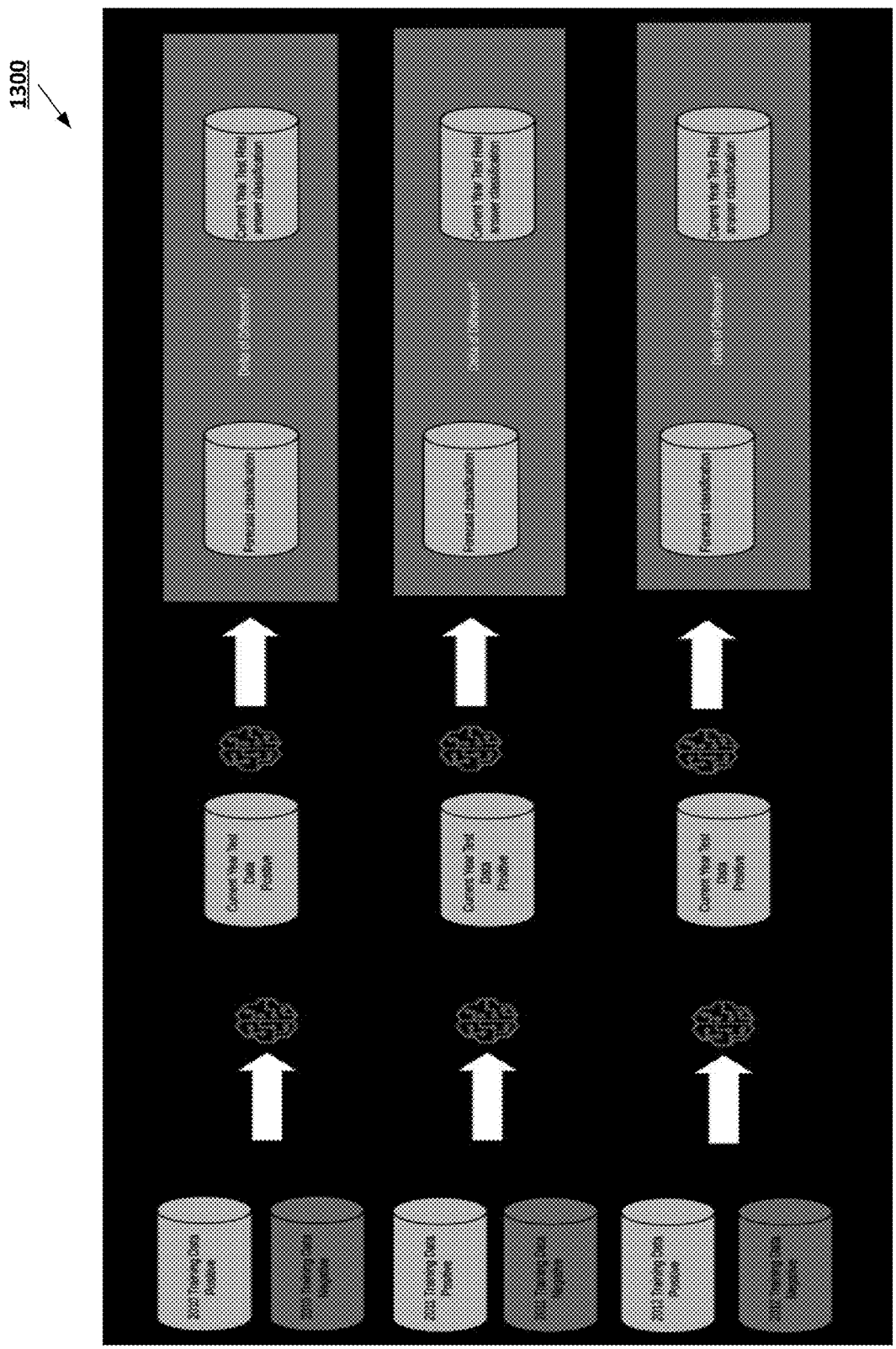

FIG. 13 provides an operational example of performing temporally dynamic predictive inferences in accordance with some embodiments discussed herein.

Figure 14:
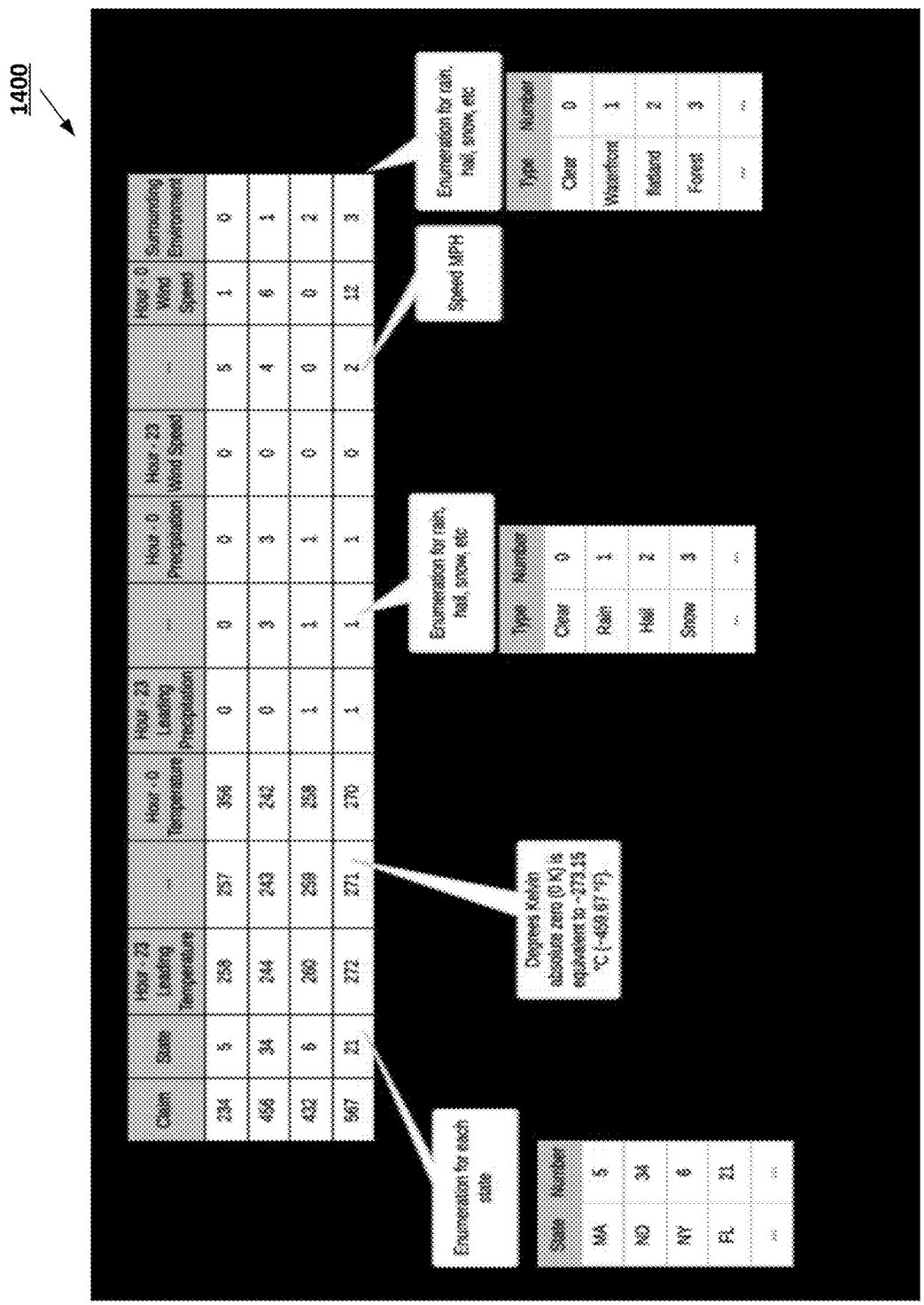

FIG. 14 provides operational examples of weather data in accordance with some embodiments discussed herein.

Figure 15:
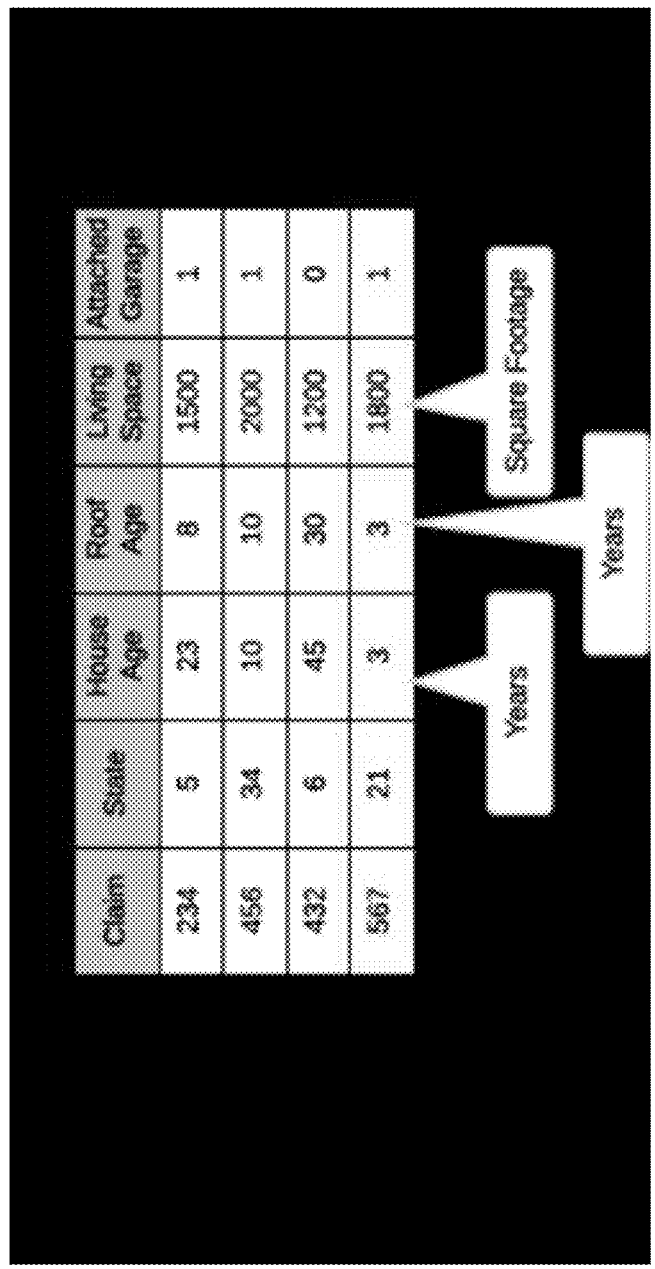

FIG. 15 provides operational examples of property damage claim data in accordance with some embodiments discussed herein.

DETAILED DESCRIPTION

Various embodiments of the present invention now will be described more fully hereinafter with reference to the accompanying drawings, in which some, but not all embodiments of the inventions are shown. Indeed, these inventions may be embodied in many different forms and should not be construed as limited to the embodiments set forth herein; rather, these embodiments are provided so that this disclosure will satisfy applicable legal requirements. The term "or" is used herein in both the alternative and conjunctive sense, unless otherwise indicated. The terms "illustrative" and "exemplary" are used to be examples with no indication of quality level. Like numbers refer to like elements throughout. Moreover, while certain embodiments of the present invention are described with reference to predictive data analysis, one of ordinary skill in the art will recognize that the disclosed concepts can be used to perform other types of data analysis.

I. OVERVIEW

Discussed herein methods, apparatus, systems, computing devices, computing entities, and/or the like for temporally dynamic predictive data analysis. As will be recognized, however, the disclosed concepts can be used to perform any type of data analysis and/or predictive data analysis using methods that are dynamic across data attributes other than time, such as across location.

A. Technical Problems

Various embodiments of the present invention address technical challenges related to predictive data analysis using non-sequential temporal data. Many existing predictive data analysis frameworks are either suited for non-temporal data and/or for temporally sequential data. Examples of predictive data analysis frameworks that are suited for non-temporal data include many conventional feedforward neural networks and many conventional convolutional neural networks. In such predictive data analysis, temporality of data is typically of little significance to the predictive task as the predictive inputs typically do not have significant temporality features. For example, in image analysis, the timestamp associated with an image may be of little significance in performing predictive inferences using the image. On the other hand, other predictive data analysis frameworks like recurrent neural networks not only address temporality of data, but also assume that the data has a sequential nature to it. Examples of predictive tasks conducive to such temporally sequential analytical approach include machine translation and speech synthesis.

Both non-temporal predictive data analysis systems and temporally sequential predictive data analysis systems are ill-suited to perform predictive data analysis system using non-sequential temporal data. Examples of such data include weather data when used to predict property damage and/or operational load of service centers. Weather data, while often sequentially disjoint, nevertheless has an important temporal aspect to them. Nevertheless, the temporal complexity of such non-sequential temporal data is not properly addressed by either non-temporal predictive data analysis systems or temporally sequential predictive data analysis systems. As a result, both predictive data analysis systems and temporally sequential predictive data analysis systems suffer from significant efficiency and reliability drawbacks when utilized to perform predictive data analysis on non-sequential temporal data.

B. Technical Solutions

Various embodiments of the present invention address technical challenges related to efficiency and reliability of predictive data analysis using non-sequential temporal data by utilizing temporally trained machine learning models. A temporally trained machine learning model may be a machine learning model trained using training data associated with corresponding time intervals. Because temporally trained machine learning models are trained using temporally defined training data, they will once trained converge to provide a snapshot of relevant predictive features of their corresponding time intervals. In this way, temporally trained machine learning models can learn and address temporal variations between training data items without making any limiting assumptions about sequential nature of data. In this way, various embodiments of the present invention address technical challenges related to efficiency and reliability of predictive data analysis using non-sequential temporal data and make important technical improvements to predictive data analysis of non-sequential temporal data.

Furthermore, various embodiments of the present invention address technical challenges related to efficiency and reliability of predictive data analysis using non-sequential temporal data by utilizing real-time ensemble models configured to aggregate outputs of temporally trained machine learning models. Real-time training inputs also have distinct temporal qualities. Integrating real-time training inputs in cross-model aggregation provides a further avenue for addressing temporal variations in data without making any limiting assumptions about sequential nature of data. Thus, by utilizing real-time ensemble models configured to aggregate outputs of temporally trained machine learning models, various embodiments of the present invention further address technical challenges related to efficiency and reliability of predictive data analysis using non-sequential temporal data and make further important technical improvements to predictive data analysis of non-sequential temporal data.

Moreover, various embodiments of the present invention address technical challenges related to property damage prediction and operational load prediction by utilizing temporally dynamic predictive data analysis techniques. Many of the proposed temporally dynamic predictive data analysis techniques significantly improve efficiency and/or reliability of existing solutions for property damage prediction and operational load prediction. For example, by utilizing historical weather data and historical claim data to train temporally-particularized machine learning models and recent weather data to validate the trained models, various embodiments of the present invention provide temporally dynamic predictive data analysis techniques for property damage prediction and operational load prediction that significantly improve efficiency and/or reliability of existing solutions for property damage prediction and operational load prediction. Thus, by utilizing temporally dynamic predictive data analysis techniques to perform property damage prediction and operational load prediction, various embodiments of the present invention address technical challenges related to efficiency and/or reliability of property damage prediction and operational load prediction, as well as make important technical contribution to technical domains related to property damage prediction and operational load prediction.

II. COMPUTER PROGRAM PRODUCTS, METHODS, AND COMPUTING ENTITIES

Embodiments of the present invention may be implemented in various ways, including as computer program products that comprise articles of manufacture. Such computer program products may include one or more software components including, for example, software objects, methods, data structures, or the like. A software component may be coded in any of a variety of programming languages. An illustrative programming language may be a lower-level programming language such as an assembly language associated with a particular hardware architecture and/or operating system platform. A software component comprising assembly language instructions may require conversion into executable machine code by an assembler prior to execution by the hardware architecture and/or platform. Another example programming language may be a higher-level programming language that may be portable across multiple architectures. A software component comprising higher-level programming language instructions may require conversion to an intermediate representation by an interpreter or a compiler prior to execution.

Other examples of programming languages include, but are not limited to, a macro language, a shell or command language, a job control language, a script language, a database query or search language, and/or a report writing language. In one or more example embodiments, a software component comprising instructions in one of the foregoing examples of programming languages may be executed directly by an operating system or other software component without having to be first transformed into another form. A software component may be stored as a file or other data storage construct. Software components of a similar type or functionally related may be stored together such as, for example, in a particular directory, folder, or library. Software components may be static (e.g., pre-established or fixed) or dynamic (e.g., created or modified at the time of execution).

A computer program product may include a non-transitory computer-readable storage medium storing applications, programs, program modules, scripts, source code, program code, object code, byte code, compiled code, interpreted code, machine code, executable instructions, and/or the like (also referred to herein as executable instructions, instructions for execution, computer program products, program code, and/or similar terms used herein interchangeably). Such non-transitory computer-readable storage media include all computer-readable media (including volatile and non-volatile media).

In one embodiment, a non-volatile computer-readable storage medium may include a floppy disk, flexible disk, hard disk, solid-state storage (SSS) (e.g., a solid state drive (SSD), solid state card (SSC), solid state module (SSM), enterprise flash drive, magnetic tape, or any other non-transitory magnetic medium, and/or the like. A non-volatile computer-readable storage medium may also include a punch card, paper tape, optical mark sheet (or any other physical medium with patterns of holes or other optically recognizable indicia), compact disc read only memory (CD-ROM), compact disc-rewritable (CD-RW), digital versatile disc (DVD), Blu-ray disc (BD), any other non-transitory optical medium, and/or the like. Such a non-volatile computer-readable storage medium may also include read-only memory (ROM), programmable read-only memory (PROM), erasable programmable read-only memory (EPROM), electrically erasable programmable read-only memory (EEPROM), flash memory (e.g., Serial, NAND, NOR, and/or the like), multimedia memory cards (MMC), secure digital (SD) memory cards, SmartMedia cards, CompactFlash (CF) cards, Memory Sticks, and/or the like. Further, a non-volatile computer-readable storage medium may also include conductive-bridging random access memory (CBRAM), phase-change random access memory (PRAM), ferroelectric random-access memory (FeRAM), non-volatile random-access memory (NVRAM), magnetoresistive random-access memory (MRAM), resistive random-access memory (RRAM), Silicon-Oxide-Nitride-Oxide-Silicon memory (SONOS), floating junction gate random access memory (FJG RAM), Millipede memory, racetrack memory, and/or the like.

In one embodiment, a volatile computer-readable storage medium may include random access memory (RAM), dynamic random access memory (DRAM), static random access memory (SRAM), fast page mode dynamic random access memory (FPM DRAM), extended data-out dynamic random access memory (EDO DRAM), synchronous dynamic random access memory (SDRAM), double data rate synchronous dynamic random access memory (DDR SDRAM), double data rate type two synchronous dynamic random access memory (DDR2 SDRAM), double data rate type three synchronous dynamic random access memory (DDR3 SDRAM), Rambus dynamic random access memory (RDRAM), Twin Transistor RAM (TTRAM), Thyristor RAM (T-RAM), Zero-capacitor (Z-RAM), Rambus in-line memory module (RIMM), dual in-line memory module (DIMM), single in-line memory module (SIMM), video random access memory (VRAM), cache memory (including various levels), flash memory, register memory, and/or the like. It will be appreciated that where embodiments are described to use a computer-readable storage medium, other types of computer-readable storage media may be substituted for or used in addition to the computer-readable storage media described above.

As should be appreciated, various embodiments of the present invention may also be implemented as methods, apparatus, systems, computing devices, computing entities, and/or the like. As such, embodiments of the present invention may take the form of an apparatus, system, computing device, computing entity, and/or the like executing instructions stored on a computer-readable storage medium to perform certain steps or operations. Thus, embodiments of the present invention may also take the form of an entirely hardware embodiment, an entirely computer program product embodiment, and/or an embodiment that comprises combination of computer program products and hardware performing certain steps or operations. Embodiments of the present invention are described below with reference to block diagrams and flowchart illustrations. Thus, it should be understood that each block of the block diagrams and flowchart illustrations may be implemented in the form of a computer program product, an entirely hardware embodiment, a combination of hardware and computer program products, and/or apparatus, systems, computing devices, computing entities, and/or the like carrying out instructions, operations, steps, and similar words used interchangeably (e.g., the executable instructions, instructions for execution, program code, and/or the like) on a computer-readable storage medium for execution. For example, retrieval, loading, and execution of code may be performed sequentially such that one instruction is retrieved, loaded, and executed at a time. In some exemplary embodiments, retrieval, loading, and/or execution may be performed in parallel such that multiple instructions are retrieved, loaded, and/or executed together. Thus, such embodiments can produce specifically-configured machines performing the steps or operations specified in the block diagrams and flowchart illustrations. Accordingly, the block diagrams and flowchart illustrations support various combinations of embodiments for performing the specified instructions, operations, or steps.

III. EXEMPLARY SYSTEM ARCHITECTURE

The architecture 100 includes one or more external computing entities 102 that interact with a predictive data analysis system 101 via a communication network (not shown). The predictive data analysis system 101 includes a storage subsystem 108 and a predictive data analysis computing entity 106. Each computing entity, computing subsystem, and/or computing system in the architecture 100 may include any suitable network server and/or other type of processing device. The communication network may include any wired or wireless communication network including, for example, a wired or wireless local area network (LAN), personal area network (PAN), metropolitan area network (MAN), wide area network (WAN), or the like, as well as any hardware, software and/or firmware required to implement it (such as, e.g., network routers, and/or the like).

In some embodiments, the architecture 100 is configured to enable the external computing entities 102 to provide prediction inputs to the predictive data analysis system 101 and, in response, receive predictions generated based on the prediction inputs. For example, a particular external computing entity 102 may provide a request for property damage predictions for a particular region and/or an operational load prediction for particular service centers in light of particular anticipated weather patterns. The predictive data analysis system 101 is configured to generate the requested predictions and provide the predictions to the particular external computing entity 102.

The predictive data analysis computing entity 106 includes a temporal modeling unit 111 and a real-time ensemble unit 112. The storage subsystem 108 stores training data 121 for the predictive data analysis computing entity 106 and model definition data for the predictive data analysis computing entity 106. The storage subsystem 108 may include one or more storage units, such as multiple distributed storage units that are connected through a computer network. Each storage unit in the storage subsystem 108 may store at least one of one or more data assets and/or one or more data about the computed properties of one or more data assets. Moreover, each storage unit in the storage subsystem 108 may include one or more non-volatile storage or memory media including but not limited to hard disks, ROM, PROM, EPROM, EEPROM, flash memory, MMCs, SD memory cards, Memory Sticks, CBRAM, PRAM, FeRAM, NVRAM, MRAM, RRAM, SONOS, FJG RAM, Millipede memory, racetrack memory, and/or the like.

The temporal modeling unit 111 is configured to train, using the training data 121 in the storage subsystem 108, multiple temporally trained machine learning models. A temporally trained machine learning model may be a machine learning model trained using training data 121 associated with one or more particular time intervals. For example, the temporal modeling unit 111 may train a first temporally trained machine learning model for data associated with the year 2018 and a second temporally trained machine learning model for data associated with the year 2019. As another example, the temporal modeling unit 111 may train a first temporally trained machine learning model based on training data 121 deemed recent and a second temporally trained machine learning model based on training data 121 deemed not recent. The temporal modeling unit 111 may store parameters and/or hyper-parameters defining each temporally trained machine learning model as part of the model definition data 122 stored on the storage subsystem 108.

The real-time ensemble unit 112 is configured to train, using real-time training data and/or real-time validation data, a real-time ensemble unit 112 configured to generate a cross-model prediction based on the outputs of the multiple temporally trained machine learning models generated by the temporal modeling unit 111. For example, the real-time ensemble model may aggregate various model-specific inputs to generate a cross-model output. As another example, the real-time ensemble model may select an output of a particular temporally trained machine learning model deemed most accurate and/or most reliable as a cross-model output. The real-time ensemble unit 112 may obtain the real-time training data and/or the real-time validation data from the training data stored 121 on the storage subsystem 108 and/or from an external computing entity 102. The real-time ensemble unit 112 may store parameters and/or hyper-parameters defining the real-time ensemble model as part of the model definition data 122 stored on the storage subsystem 108.

A. Exemplary Predictive Data Analysis Computing Entity

FIG. 2 provides a schematic of a predictive data analysis computing entity 106 according to one embodiment of the present invention. In general, the terms computing entity, computer, entity, device, system, and/or similar words used herein interchangeably may refer to, for example, one or more computers, computing entities, desktops, mobile phones, tablets, phablets, notebooks, laptops, distributed systems, kiosks, input terminals, servers or server networks, blades, gateways, switches, processing devices, processing entities, set-top boxes, relays, routers, network access points, base stations, the like, and/or any combination of devices or entities adapted to perform the functions, operations, and/or processes described herein. Such functions, operations, and/or processes may include, for example, transmitting, receiving, operating on, processing, displaying, storing, determining, creating/generating, monitoring, evaluating, comparing, and/or similar terms used herein interchangeably. In one embodiment, these functions, operations, and/or processes can be performed on data, content, information, and/or similar terms used herein interchangeably.

As indicated, in one embodiment, the predictive data analysis computing entity 106 may also include one or more communications interfaces 220 for communicating with various computing entities, such as by communicating data, content, information, and/or similar terms used herein interchangeably that can be transmitted, received, operated on, processed, displayed, stored, and/or the like.

As shown in FIG. 2, in one embodiment, the predictive data analysis computing entity 106 may include or be in communication with one or more processing elements 205 (also referred to as processors, processing circuitry, and/or similar terms used herein interchangeably) that communicate with other elements within the predictive data analysis computing entity 106 via a bus, for example. As will be understood, the processing element 205 may be embodied in a number of different ways. For example, the processing element 205 may be embodied as one or more complex programmable logic devices (CPLDs), microprocessors, multi-core processors, coprocessing entities, application-specific instruction-set processors (ASIPs), microcontrollers, and/or controllers. Further, the processing element 205 may be embodied as one or more other processing devices or circuitry. The term circuitry may refer to an entirely hardware embodiment or a combination of hardware and computer program products. Thus, the processing element 205 may be embodied as integrated circuits, application specific integrated circuits (ASICs), field programmable gate arrays (FPGAs), programmable logic arrays (PLAs), hardware accelerators, other circuitry, and/or the like. As will therefore be understood, the processing element 205 may be configured for a particular use or configured to execute instructions stored in volatile or non-volatile media or otherwise accessible to the processing element 205. As such, whether configured by hardware or computer program products, or by a combination thereof, the processing element 205 may be capable of performing steps or operations according to embodiments of the present invention when configured accordingly.

In one embodiment, the predictive data analysis computing entity 106 may further include or be in communication with non-volatile media (also referred to as non-volatile storage, memory, memory storage, memory circuitry and/or similar terms used herein interchangeably). In one embodiment, the non-volatile storage or memory may include one or more non-volatile storage or memory media 210, including but not limited to hard disks, ROM, PROM, EPROM, EEPROM, flash memory, MMCs, SD memory cards, Memory Sticks, CBRAM, PRAM, FeRAM, NVRAM, MRAM, RRAM, SONOS, FJG RAM, Millipede memory, racetrack memory, and/or the like. As will be recognized, the non-volatile storage or memory media may store databases, database instances, database management systems, data, applications, programs, program modules, scripts, source code, object code, byte code, compiled code, interpreted code, machine code, executable instructions, and/or the like. The term database, database instance, database management system, and/or similar terms used herein interchangeably may refer to a collection of records or data that is stored in a computer-readable storage medium using one or more database models, such as a hierarchical database model, network model, relational model, entity-relationship model, object model, document model, semantic model, graph model, and/or the like.

In one embodiment, the predictive data analysis computing entity 106 may further include or be in communication with volatile media (also referred to as volatile storage, memory, memory storage, memory circuitry and/or similar terms used herein interchangeably). In one embodiment, the volatile storage or memory may also include one or more volatile storage or memory media 215, including but not limited to RAM, DRAM, SRAM, FPM DRAM, EDO DRAM, SDRAM, DDR SDRAM, DDR2 SDRAM, DDR3 SDRAM, RDRAM, TTRAM, T-RAM, Z-RAM, RIMM, DIMM, SIMM, VRAM, cache memory, register memory, and/or the like. As will be recognized, the volatile storage or memory media may be used to store at least portions of the databases, database instances, database management systems, data, applications, programs, program modules, scripts, source code, object code, byte code, compiled code, interpreted code, machine code, executable instructions, and/or the like being executed by, for example, the processing element 205. Thus, the databases, database instances, database management systems, data, applications, programs, program modules, scripts, source code, object code, byte code, compiled code, interpreted code, machine code, executable instructions, and/or the like may be used to control certain aspects of the operation of the predictive data analysis computing entity 106 with the assistance of the processing element 205 and operating system.

As indicated, in one embodiment, the predictive data analysis computing entity 106 may also include one or more communications interfaces 220 for communicating with various computing entities, such as by communicating data, content, information, and/or similar terms used herein interchangeably that can be transmitted, received, operated on, processed, displayed, stored, and/or the like. Such communication may be executed using a wired data transmission protocol, such as fiber distributed data interface (FDDI), digital subscriber line (DSL), Ethernet, asynchronous transfer mode (ATM), frame relay, data over cable service interface specification (DOCSIS), or any other wired transmission protocol. Similarly, the predictive data analysis computing entity 106 may be configured to communicate via wireless external communication networks using any of a variety of protocols, such as general packet radio service (GPRS), Universal Mobile Telecommunications System (UMTS), Code Division Multiple Access 2000 (CDMA2000), CDMA2000 1× (1×RTT), Wideband Code Division Multiple Access (WCDMA), Global System for Mobile Communications (GSM), Enhanced Data rates for GSM Evolution (EDGE), Time Division-Synchronous Code Division Multiple Access (TD-SCDMA), Long Term Evolution (LTE), Evolved Universal Terrestrial Radio Access Network (E-UTRAN), Evolution-Data Optimized (EVDO), High Speed Packet Access (HSPA), High-Speed Downlink Packet Access (HSDPA), IEEE 802.11 (Wi-Fi), Wi-Fi Direct, 802.16 (WiMAX), ultra-wideband (UWB), infrared (IR) protocols, near field communication (NFC) protocols, Wibree, Bluetooth protocols, wireless universal serial bus (USB) protocols, and/or any other wireless protocol.

Although not shown, the predictive data analysis computing entity 106 may include or be in communication with one or more input elements, such as a keyboard input, a mouse input, a touch screen/display input, motion input, movement input, audio input, pointing device input, joystick input, keypad input, and/or the like. The predictive data analysis computing entity 106 may also include or be in communication with one or more output elements (not shown), such as audio output, video output, screen/display output, motion output, movement output, and/or the like.

B. Exemplary External Computing Entity

FIG. 3 provides an illustrative schematic representative of an external computing entity 102 that can be used in conjunction with embodiments of the present invention. In general, the terms device, system, computing entity, entity, and/or similar words used herein interchangeably may refer to, for example, one or more computers, computing entities, desktops, mobile phones, tablets, phablets, notebooks, laptops, distributed systems, kiosks, input terminals, servers or server networks, blades, gateways, switches, processing devices, processing entities, set-top boxes, relays, routers, network access points, base stations, the like, and/or any combination of devices or entities adapted to perform the functions, operations, and/or processes described herein. External computing entities 102 can be operated by various parties. As shown in FIG. 3, the external computing entity 102 can include an antenna 312, a transmitter 304 (e.g., radio), a receiver 306 (e.g., radio), and a processing element 308 (e.g., CPLDs, microprocessors, multi-core processors, coprocessing entities, ASIPs, microcontrollers, and/or controllers) that provides signals to and receives signals from the transmitter 304 and receiver 306, respectively.

The signals provided to and received from the transmitter 304 and the receiver 306, respectively, may include signaling information/data in accordance with air interface standards of applicable wireless systems. In this regard, the external computing entity 102 may be capable of operating with one or more air interface standards, communication protocols, modulation types, and access types. More particularly, the external computing entity 102 may operate in accordance with any of a number of wireless communication standards and protocols, such as those described above with regard to the predictive data analysis computing entity 106. In a particular embodiment, the external computing entity 102 may operate in accordance with multiple wireless communication standards and protocols, such as UMTS, CDMA2000, 1×RTT, WCDMA, GSM, EDGE, TD-SCDMA, LTE, E-UTRAN, EVDO, HSPA, HSDPA, Wi-Fi, Wi-Fi Direct, WiMAX, UWB, IR, NFC, Bluetooth, USB, and/or the like. Similarly, the external computing entity 102 may operate in accordance with multiple wired communication standards and protocols, such as those described above with regard to the predictive data analysis computing entity 106 via a network interface 320.

Via these communication standards and protocols, the external computing entity 102 can communicate with various other entities using concepts such as Unstructured Supplementary Service Data (USSD), Short Message Service (SMS), Multimedia Messaging Service (MMS), Dual-Tone Multi-Frequency Signaling (DTMF), and/or Subscriber Identity Module Dialer (SIM dialer). The external computing entity 102 can also download changes, add-ons, and updates, for instance, to its firmware, software (e.g., including executable instructions, applications, program modules), and operating system.

According to one embodiment, the external computing entity 102 may include location determining aspects, devices, modules, functionalities, and/or similar words used herein interchangeably. For example, the external computing entity 102 may include outdoor positioning aspects, such as a location module adapted to acquire, for example, latitude, longitude, altitude, geocode, course, direction, heading, speed, universal time (UTC), date, and/or various other information/data. In one embodiment, the location module can acquire data, sometimes known as ephemeris data, by identifying the number of satellites in view and the relative positions of those satellites (e.g., using global positioning systems (GPS)). The satellites may be a variety of different satellites, including Low Earth Orbit (LEO) satellite systems, Department of Defense (DOD) satellite systems, the European Union Galileo positioning systems, the Chinese Compass navigation systems, Indian Regional Navigational satellite systems, and/or the like. This data can be collected using a variety of coordinate systems, such as the Decimal Degrees (DD); Degrees, Minutes, Seconds (DMS); Universal Transverse Mercator (UTM); Universal Polar Stereographic (UPS) coordinate systems; and/or the like. Alternatively, the location information/data can be determined by triangulating the external computing entity's position in connection with a variety of other systems, including cellular towers, Wi-Fi access points, and/or the like. Similarly, the external computing entity 102 may include indoor positioning aspects, such as a location module adapted to acquire, for example, latitude, longitude, altitude, geocode, course, direction, heading, speed, time, date, and/or various other information/data. Some of the indoor systems may use various position or location technologies including RFID tags, indoor beacons or transmitters, Wi-Fi access points, cellular towers, nearby computing devices (e.g., smartphones, laptops) and/or the like. For instance, such technologies may include the iBeacons, Gimbal proximity beacons, Bluetooth Low Energy (BLE) transmitters, NFC transmitters, and/or the like. These indoor positioning aspects can be used in a variety of settings to determine the location of someone or something to within inches or centimeters.

The external computing entity 102 may also comprise a user interface (that can include a display 316 coupled to a processing element 308) and/or a user input interface (coupled to a processing element 308). For example, the user interface may be a user application, browser, user interface, and/or similar words used herein interchangeably executing on and/or accessible via the external computing entity 102 to interact with and/or cause display of information/data from the predictive data analysis computing entity 106, as described herein. The user input interface can comprise any of a number of devices or interfaces allowing the external computing entity 102 to receive data, such as a keypad 318 (hard or soft), a touch display, voice/speech or motion interfaces, or other input device. In embodiments including a keypad 318, the keypad 318 can include (or cause display of) the conventional numeric (0-9) and related keys (#, *), and other keys used for operating the external computing entity 102 and may include a full set of alphabetic keys or set of keys that may be activated to provide a full set of alphanumeric keys. In addition to providing input, the user input interface can be used, for example, to activate or deactivate certain functions, such as screen savers and/or sleep modes.

The external computing entity 102 can also include volatile storage or memory 322 and/or non-volatile storage or memory 324, which can be embedded and/or may be removable. For example, the non-volatile memory may be ROM, PROM, EPROM, EEPROM, flash memory, MMCs, SD memory cards, Memory Sticks, CBRAM, PRAM, FeRAM, NVRAM, MRAM, RRAM, SONOS, FJG RAM, Millipede memory, racetrack memory, and/or the like. The volatile memory may be RAM, DRAM, SRAM, FPM DRAM, EDO DRAM, SDRAM, DDR SDRAM, DDR2 SDRAM, DDR3

SDRAM, RDRAM, TTRAM, T-RAM, Z-RAM, RIMM, DIMM, SIMM, VRAM, cache memory, register memory, and/or the like. The volatile and non-volatile storage or memory can store databases, database instances, database management systems, data, applications, programs, program modules, scripts, source code, object code, byte code, compiled code, interpreted code, machine code, executable instructions, and/or the like to implement the functions of the external computing entity 102. As indicated, this may include a user application that is resident on the entity or accessible through a browser or other user interface for communicating with the predictive data analysis computing entity 106 and/or various other computing entities.

In another embodiment, the external computing entity 102 may include one or more components or functionality that are the same or similar to those of the predictive data analysis computing entity 106, as described in greater detail above. As will be recognized, these architectures and descriptions are provided for exemplary purposes only and are not limiting to the various embodiments.

In various embodiments, the external computing entity 102 may be embodied as an artificial intelligence (AI) computing entity, such as an Amazon Echo, Amazon Echo Dot, Amazon Show, Google Home, and/or the like. Accordingly, the external computing entity 102 may be configured to provide and/or receive information/data from a user via an input/output mechanism, such as a display, a camera, a speaker, a voice-activated input, and/or the like. In certain embodiments, an AI computing entity may comprise one or more predefined and executable program algorithms stored within an onboard memory storage module, and/or accessible over a network. In various embodiments, the AI computing entity may be configured to retrieve and/or execute one or more of the predefined program algorithms upon the occurrence of a predefined trigger event.

IV. EXEMPLARY SYSTEM OPERATION

The operation of various embodiments of the present invention will now be described. As discussed herein, various embodiments are directed to systems and methods for temporally dynamic predictive inferences. Various embodiments of the disclosed techniques enable predictive data analysis by using temporally trained machine learning models, real-time ensemble models, and/or trend-based predictive data analysis frameworks that utilize temporally dynamic techniques. Various embodiments of the disclosed techniques enable predicting property damage prediction and/or service center operational load prediction based on historic training data as well as recent (e.g., real-time) validation data.

Temporally Dynamic Predictive Data Analysis

FIG. 4 is a flowchart diagram of an example process 400 for generating a temporally dynamic prediction based on historic training inputs and real-time training inputs. Via the various steps/operations of the process 400, the predictive data analysis computing entity 106 can generate temporally dynamic predictions using various temporally trained machine learning models, where the outputs of the various temporally trained models are aggregated using a real-time ensemble model.

The process 400 begins at step/operation 401 when the temporal modeling unit 111 obtains the historic training features. In some embodiments, each historic training input is associated with one or more prediction features, one or more target predictions, and a timestamp. For example, an example historic training input may be a data object associated with a particular timestamp that associates at least one of geographic data for a particular disaster relief claim, event description data for the particular disaster relief claim, claim description data for the particular disaster relief claim, weather description data for the particular disaster relief claim, etc. (collectively the prediction features for the data object) to at least one of a disaster type prediction for the particular disaster relief claim, a disaster severity prediction for the particular disaster relief claim, a claim magnitude prediction for the particular disaster relief prediction, etc.

In some embodiments, the timestamps associated with at least some of the historic training inputs have a non-sequential relationship with each other. For example, many historic training inputs can have the same timestamp and/or may have timestamps that, while different from each other, do not indicate a position of each historic training input in a sequential order of the historic training inputs. In this way, the historic training inputs may be distinct from both non-temporal data (e.g., non-temporal image data in many image classification applications) and temporally sequential data (e.g., sequential data in translation and/or speech generation applications). Because of this, in some embodiments, the historic training inputs are ill-adapted for processing by both non-temporal machine learning models (e.g., conventional feedforward neural networks and/or conventional convolutional neural networks) and temporally sequential machine learning models (e.g., recurrent neural networks, such as Long Short-Term Memory (LSTM) neural networks).

In some embodiments, the historic training inputs are from various different data sources having different timestamp formats. For example, a first portion of the historic training inputs may be from a weather data source having a first timestamp format, a second portion of historic training inputs may be from a disaster relief claim data sources having a second timestamp format, and a third portion of historic training inputs may be from a geographic information data source having a third timestamp format. In some embodiments, at least one of the various data sources may lack timestamps and/or may include timestamps that differ in format from the formats of timestamps of at least one other data source. In some embodiments, to address such disparities, the temporal modeling unit 111 performs temporal regularization on the historic training inputs from various data sources by performing at least one of the following operations: (i) determining an estimated timestamp for each historic training input associated with a data sources that lacks a timestamp; and (ii) converting the timestamps for the historic prediction inputs from various data sources into a regularized timestamp having a unified timestamp format. In some embodiments, to determine estimated timestamps, the temporal modeling unit 111 performs cross-data source inferences by detecting that a first historic training input from a first data source having a timestamp relates to a second historic training input from a second data sources not having a timestamp and determining a timestamp for the second historic training input based on the timestamp for the first historic training input.

At step/operation 402, the temporal modeling unit 111 generates the temporally trained machine learning models. In some embodiments, each temporally trained model is a machine learning model trained using data associated with one or more temporal units, where a temporal unit may comprise one or more disjoint temporal intervals. In some embodiments, the one or more temporal units are determined using an unsupervised learning model, such as a clustering model. For example, the temporal modeling unit 111 may determine one or more discrete time periods from a range of timestamps associated with the historic training inputs obtained in step/operation 401, plot each discrete time period based on one or more properties associated with the discrete time period in an n-dimensional period-property space, and determine one or more discrete time period clusters based on distribution of the noted plot (e.g., by using a clustering algorithm, such as the k nearest neighbor algorithm).

In some embodiments, step/operation 402 is performed using the steps/operations depicted in FIG. 5. The process of FIG. 5 begins at step/operation 501 when the temporal modeling unit 111 identifies one or more temporal units based on a range of time stamps with the historic training inputs obtained in step/operation 401, where a temporal unit may comprise one or more disjoint temporal intervals. In some embodiments, given n timestamp intervals associated with the historic training inputs obtained in step/operation 401, the temporal modeling unit 111 divides the n timestamp intervals into m clusters, where each cluster may include a variable number of timestamp intervals. In some embodiments, at least one of n (e.g., the time discretization parameter) and m (e.g., the time division parameter) are preconfigured using configuration data associated with the predictive data analysis computing entity 106. In some embodiments, at least one of n and m are determined using a machine learning model trained to optimize a performance metric (e.g., training inefficiency, inference inefficiency, inference accuracy, etc.) of predictive inferences performed using the predictive data analysis computing entity 106.

At step/operation 502, the temporal modeling unit 111 divides the historic training inputs obtained in step/operation 401 into n portions, where each portion of the historic training inputs includes those historic training inputs that are associated with a timestamp in a respective temporal unit of the n temporal units. For example, the temporal modeling unit 111 may divide disaster relief-related data associated with the years 1990-1995 into a first portion of historic training inputs, disaster relief-related data associated with the years 1995-2000 into a second portion of historic training inputs, etc. In some embodiments, the temporal modeling unit 111 divides the historic training inputs obtained in step/operation 401 into recent historic training inputs and old historic training inputs, where the recency threshold used to distinguish historic training inputs and old historic training inputs may be preconfigured and/or may be determined using a machine learning model trained to optimize a performance metric (e.g., training inefficiency, inference inefficiency, inference accuracy, etc.) of predictive inferences performed using the predictive data analysis computing entity 106.

At step/operation 503, the temporal modeling unit 111 trains a temporally trained machine learning model for each temporal unit of the n temporal units based on the portion of historic training inputs associated with the respective temporal unit. In some embodiments, the temporal modeling unit 111 adjusts parameters and/or hyper-parameters of a machine learning model associated with a temporal unit of the n temporal units identified in step/operation 501 based on a measure of error between inferred predictions generated by the machine learning model and target predictions associated with the portion of historic prediction inputs for the temporal unit. For example, the temporal modeling unit 111 may train at least some of the temporally trained machine learning models using on a training algorithm that adjusts parameters of the machine learning model based on a gradient of a measure of error between inferred predictions generated for the temporal units and target predictions for the temporal units. Examples of training algorithms suitable for the noted purpose include gradient descent, gradient descent with backpropagation, and gradient descent with backpropagation over time.

In some embodiments, training separate machine learning models for different temporal units (e.g., for different time intervals) enables the predictive data analysis computing entity 106 to account for temporality of underlying data without processing data as a sequence. As discussed earlier, the timestamps associated with at least some of the historic training inputs have a non-sequential relationship with each other. For example, many historic training inputs can have the same timestamp and/or may have timestamps that, while different from each other, do not indicate a position of each historic training input in a sequential order of the historic training inputs. In this way, the historic training inputs may be distinct from both non-temporal data (e.g., non-temporal image data in many image classification applications) and temporally sequential data (e.g., sequential data in translation and/or speech generation applications). Because of this, in some embodiments, the historic training inputs are ill-adapted for processing by both non-temporal machine learning models (e.g., conventional feedforward neural networks and/or conventional convolutional neural networks) and temporally sequential machine learning models (e.g., recurrent neural networks, such as LSTM networks). In some embodiments, by addressing temporality of underlying training data without processing the underlying training in a sequential manner, aspects of the machine learning techniques discussed herein enable efficient and reliable predictive data analysis models which are well-suited for performing predictive inferences based on non-sequential temporal training data.

Returning to FIG. 4, at step/operation 403, the real-time ensemble unit 112 generates the real-time ensemble model to aggregate the temporally trained machine learning models generated in step/operation 402. In some embodiments, the real-time ensemble unit 112 generates an aggregation parameter for each temporally trained machine learning model of the temporally trained machine learning models generated in step/operation 402 based on a measure of error between an inferred prediction for particular real-time features determined using the particular temporally trained machine learning model and a real-time training prediction for the particular real-time features among the real-time training inputs. For example, the real-time ensemble unit 112 may train the real-time ensemble model using a training algorithm that adjusts parameters of the real-time ensemble model based on a gradient of a measure of error between an inferred prediction for particular real-time features determined using the particular temporally trained machine learning model and a real-time training prediction for the particular real-time features among the real-time training inputs. Examples of training algorithms suitable for the noted purpose include gradient descent, gradient descent with backpropagation, and gradient descent with backpropagation over time.

In some embodiments, step/operation 403 may be performed using the steps/operations depicted in FIG. 6. The process depicted in FIG. 6 begins at step/operation 601 when the real-time ensemble unit 112 obtains real-time training features. In some embodiments, the real-time training features may correspond to feature data for an ongoing real-world event. For example, the real-time ensemble unit 112 may obtain weather data about an ongoing disaster and/or geographic data about an ongoing disaster. In some embodiments, the real-time ensemble unit 112 obtains at least a portion of the real-time training features using a real-time streaming feed, such as a real-time streaming feed associated with a weather reporting computing entity. In some embodiments, the real-time ensemble unit 112 obtains the real-time training features from various data sources and aggregates the real-time training features from the various data sources to generate a data object that contains the real-time training features.

At step/operation 602, the real-time ensemble unit 112 performs a predictive inference using each of the temporally trained machine learning models generated in step/operation 402 based on the real-time training features obtained in step/operation 501 to generate a corresponding temporal prediction for the temporally trained machine learning model. In some embodiments, the real-time ensemble unit 112 applies parameters and/or hyper-parameters of each temporally trained machine learning model generated in step/operation 402 to the real-time training features obtained in step/operation 601 in order to generate a corresponding temporal prediction for the temporally trained machine learning model. In some embodiments, to apply parameters and/or hyper-parameters of each temporally trained machine learning model to the real-time training features in order to generate a corresponding temporal prediction for the temporally trained machine learning model, the real-time ensemble unit 112 performs a forward propagation within a layered network associated with the temporally trained machine learning model based on the real-time training features as inputs to the forward propagation.

At step/operation 603, the real-time ensemble unit 112 obtains real-time training predictions for the real-time training features obtained in step/operation 501. In some embodiments, at a time after the time associated with receiving the real-time training features, the real-time ensemble unit 112 obtains a ground-truth prediction for the real-time training features. For example, the ground-truth prediction may relate to a real-world weather occurrence corresponding to particular weather prediction features, a real-world disaster severity observation corresponding to particular disaster prediction features, a real-world insurance claim severity observation corresponding to particular claim severity features, etc. In some embodiments, the real-time ensemble unit 112 obtains at least a portion of the real-time training predictions using a real-time streaming feed, such as a real-time streaming feed associated with a news reporting computing entity. In some embodiments, the real-time ensemble unit 112 obtains the real-time training predictions from various data sources and aggregates the real-time training predictions from the various data sources to generate a data object that contains the real-time training predictions.

At step/operation 604, the real-time ensemble unit 112 generates an aggregation parameter for each temporally trained machine learning model generated in step/operation 402 based on a measure of error between the temporal prediction for the temporally trained machine learning model generated in step/operation 602 and the training prediction obtained in step/operation 603. In some embodiments, the real-time ensemble unit 112 may generate an aggregation parameter for each temporally trained machine learning model generated in step/operation 402 based on an algorithm that adjusts the aggregation parameter based on a gradient of a measure of error between the temporal prediction for the temporally trained machine learning model generated in step/operation 602 and the training prediction obtained in step/operation 603. Examples of training algorithms suitable for the noted purpose include gradient descent, gradient descent with backpropagation, and gradient descent with backpropagation over time. At step/operation 605, the real-time ensemble unit 112 aggregates each aggregation parameter for a temporally trained machine learning model generated in step/operation 604 to generate the real-time ensemble model.

In some embodiments, aggregating various machine learning models based on real-time training data provides a further mechanism to integrate temporality of underlying training data without imposing a sequential model on the overall machine learning framework. As discussed earlier, the timestamps associated with at least some of the historic training inputs have a non-sequential relationship with each other. In some embodiments, by aggregating various machine learning models based on real-time training data, aspects of the machine learning techniques discussed herein enable efficient and reliable predictive data analysis models which are well-suited for performing predictive inferences based on non-sequential temporal training data.

Returning to FIG. 4, at step/operation 404, the predictive data analysis computing entity 106 generates the temporally dynamic prediction. In some embodiments, the predictive data analysis computing entity 106 obtains inference input features, processes the inference input features using each of the temporally trained machine learning models generated in step/operation 402 to generate a corresponding model-specific prediction, processes each model-specific prediction for a temporally trained machine learning model based on an aggregation parameter for the temporally trained machine learning model to generate an adjusted model-specific prediction for the temporally trained machine learning model, and generates the temporally dynamic prediction based on each adjusted model-specific prediction for a temporally trained machine learning model of the temporally trained machine learning models generated in step/operation 402.

In some embodiments, step/operation 404 may be performed in accordance with the various steps/operations depicted in the data flow diagram of FIG. 7. The process depicted in FIG. 7 includes providing the inference input features 701 to each temporally trained machine learning subunit 111A-N of the temporal modeling unit 111. Each temporally trained machine learning subunit 111A-N of the temporal modeling unit 111 in turn applies a corresponding temporally trained machine learning model to the inference input features 701 to generate a corresponding model-specific prediction 702A-N. The temporally trained machine learning models utilized by the temporally trained machine learning subunits 111A-N of the temporal modeling unit 111 may include any suitable machine learning models, such as one or more regression models (e.g., one or more linear regression models and/or one or more polynomial regression models), one or more neural network models (e.g., one or more feedforward neural network models, one or more convolutional neural network models, and/or one or more recurrent neural network models), one or more support vector machines, one or more evolutionary machine learning models, etc.

The process depicted in FIG. 7 continues when the real-time ensemble unit 112 aggregates the model-specific predictions 702A-N generated by the temporally trained machine learning models associated with the temporally trained machine learning subunits 111A-N of the temporal modeling unit 111 to generate the temporally dynamic prediction 703 for the inference input features 701. In some embodiments, the real-time ensemble unit 112 applies an aggregation parameter for each temporally trained machine learning model associated with a respective temporally trained machine learning subunit 111A-N of the temporal modeling unit 111 to the respective model-specific prediction generated by the temporally trained machine learning model to generate an adjusted model-specific prediction. Thereafter, the real-time ensemble unit 112 aggregates each adjusted model-specific prediction to generate the temporally dynamic prediction 703 for the inference input features 701. For example, the real-time ensemble unit 112 may generate the temporally dynamic prediction 703 for the inference input features 701 based on at least one of a median, weighed mean, median, and mode of the adjusted model-specific predictions.

Automated Property Damage and Operational Load Prediction

FIG. 8 provides a flowchart diagram of an example process 800 for selecting a machine learning algorithm suitable for property damage and operational load prediction. Via the various steps/operations of process 800, the predictive data analysis computing entity 106 can select an optimal machine learning algorithm deemed best suited for prediction of property damage and operational load given complexities of underlying feature data.

The process 800 begins at step/operation 801 when the predictive data analysis computing entity 106 obtains weather data for a particular period. In some embodiments, the predictive data analysis computing entity 106 may obtain weather data from a real-time weather reporting server, such as a real-time weather reporting service associated with the National Oceanic and Atmospheric Administration (NOAA), with weather.com, with weatherunderground.com. For example, the predictive data analysis computing entity 106 may obtain the following historical weather metrics for a particular period (e.g., for the past four years): timestamps (e.g., Greenwich Mean Time (GMT) timestamps) associated with various weather events, location identifiers (e.g., zip code identifiers and/or Global Positioning System (GPS) identifiers) associated with various weather events, temperature identifiers associated with various weather events, wind speed metrics associated with various weather events, wind direction metrics associated with various weather events, cloud coverage metrics associated with various weather events, precipitations type identifiers associated with various weather events, precipitation volume metrics associated with various weather events, tidal information associated with various weather events, sunrise time identifiers associated with various weather events, sunset time identifiers associated with various weather events, lunar orbit identifiers associated with various weather events, solar event metrics (e.g., solar flare metrics and/or solar dark spot counts) associated with various weather events, etc.

At step/operation 802, the predictive data analysis computing entity 106 obtains property damage claim data for the particular period. In some embodiments, the predictive data analysis computing entity collects historical metrics related to the following items for the past four years: timestamps associated with various property damage claims, location identifiers (e.g., zip code identifiers and/or GPS identifiers) associated with various property damage claims, property damage type statistics (e.g., roof damage type statistics, glass damage type statistics, tree damage type statistics, fire statistics, etc.) associated with various property damage claims, policy coverage metrics associated with various property damage claims, damage cost metrics associated with various property damage claims, property vacation and hotel need statistics associated with various property damage claims, fixing time periods associated with various property damage claims, personal injury statistics associated with various property damage claims, etc.

At step/operation 803, the predictive data analysis computing entity 106 synchronizes the weather data obtained in step/operation 801 and the property damage claim data obtained in step/operation 802 by at least one of time and/or location to generate synchronized feature data. In some embodiments, the predictive data analysis computing entity 106 determines, for each temporal unit (e.g., combination of one or more time intervals), the weather data entries among the weather data obtained in step/operation 801 and the property damage claim data entries among the property damage claim data obtained in step/operation 802 that relate to the temporal unit. In some embodiments, the predictive data analysis computing entity 106 determines, for each locational unit (e.g., combination of one or more geographic intervals and/or location identifiers), the weather data entries among the weather data obtained in step/operation 801 and the property damage claim data entries among the property damage claim data obtained in step/operation 802 that relate to the locational unit. In some embodiments, the predictive data analysis computing entity 106 determines, for each pair of a temporal unit and a locational unit, the weather data entries among the weather data obtained in step/operation 801 and the property damage claim data entries among the property damage claim data obtained in step/operation 802 that relate to the temporal unit-locational unit pair.

At step/operation 804, the predictive data analysis computing entity 106 divides the synchronized feature data generated in step/operation 803 into recent feature data and old feature data. For example, the predictive data analysis computing entity 106 selects synchronized feature data entries that are older than a recency threshold as old feature data and other synchronized feature data entries as recent feature data. In some embodiments, the recency threshold is twelve months. In some embodiments, selecting twelve months as the recency threshold allows the recent feature data to properly accommodate seasonal and/or cross-seasonal patterns, as selecting twelve months as the recency threshold enables processing data from all four seasons as part of the recent data.

At step/operation 805, the predictive data analysis computing entity 106 trains n machine learning algorithms based on the old feature data. In some embodiments, the n machine learning algorithms may each integrate one or more various machine learning models. Examples of machine learning models include but are not limited to linear models, poly linear models, binary trees, recurrent neural network models such as LSTM models, etc. In some embodiments, the predictive data analysis computing entity 106 trains the n machine learning algorithms based on a gradient-descent-based training algorithm. Examples of gradient-descent-based training algorithms include gradient descent, gradient descent with backpropagation, and gradient descent with backpropagation over time.

At step/operation 806, the predictive data analysis computing entity 106 validates each trained machine learning model generated in step/operation 806 using the recent feature data entries generated in step/operation 804 to generate a validation prediction about property damage and/or operational load for each recent feature data entry generated in step/operation 804. In some embodiments, for each recent feature data entry and using each trained machine learning model, the predictive data analysis computing entity 106 generates a prediction about property damage resulting from a real-world event associated with the recent feature data entry and/or the operational load resulting from a real-world event associated with the recent feature data entry. For example, a prediction about property damage may indicate one or more predicted metrics about frequency and/or severity of damage to particular structures within a particular locational unit and/or within a particular temporal unit. As another example, a prediction about operational load may indicate one or more predicted metrics about claim frequency, service request frequency (e.g., service call frequency), claim severity, and/or request service severity within a particular locational unit and/or within a particular temporal unit.

At step/operation 807, the predictive data analysis computing entity 106 determines, for each temporal unit and/or locational unit and each machine algorithm trained in step/operation 805, a measure of validation error based on the difference between the validation predictions generated by the machine learning algorithm for the temporal unit and/or the locational unit and ground-truth predictions associated with the recent feature data entries. For example, the predictive data analysis computing entity 106 may determine, for each temporal unit and locational unit as well as each machine learning algorithm, an aggregate measure of difference between predictions of the machine learning algorithm for the temporal unit-locational unit and corresponding grand-truth data across all of the recent feature data entries for the temporal unit-locational unit. In some embodiments, the predictive data analysis computing entity 106 determines a measure of validation error for each temporal unit (e.g., for September of 1999) and each machine learning algorithm. In some embodiments, the predictive data analysis computing entity 106 determines a measure of validation error for each locational unit (e.g., for New York City) and each machine learning algorithm. In some embodiments, the predictive data analysis computing entity 106 determines a measure of validation error for each pair of locational unit and temporal unit (e.g., for New York City in September of 1999) and each machine learning algorithm.

At step/operation 808, the predictive data analysis computing entity 106 selects, for each temporal unit and/or locational unit, a machine learning algorithm from the machine learning algorithms generated in step/operation 805 based on each measure of validation error associated with the temporal unit and/or locational unit. In some embodiments, the predictive data analysis computing entity 106 selects a machine learning algorithm having the lowest measure of validation error with respect to a temporal unit and/or a locational unit as the machine learning algorithm for the temporal unit and/or the locational unit. In some embodiments, the predictive data analysis computing entity 106 selects a machine learning algorithm for each locational unit (e.g., for New York City). In some embodiments, the predictive data analysis computing entity 106 selects a machine learning algorithm for each temporal unit (e.g., for September of 1999). In some embodiments, the predictive data analysis computing entity 106 selects a machine learning algorithm for each pair of locational unit and temporal unit (e.g., for New York City in September of 1999).

FIG. 9 is a flowchart diagram of an example process 900 for performing prediction-based actions based on property damage claim predictions. Via the various steps/operations of process 900, the predictive data analysis computing entity 106 can generate property damage claim predictions and utilize those predictions to perform actions configured to facilitate proactive crisis management.

The process 900 begins at step/operation 901 when the predictive data analysis computing entity 106 obtains periodic weather data. For example, the predictive data analysis computing entity 106 can obtain weather data every 24 hours. In some embodiments, the predictive data analysis computing entity 106 may obtain weather data from a real-time weather reporting server, such as a real-time weather reporting service associated with the NOAA, with weather.com, with weatherunderground.com. For example, the predictive data analysis computing entity 106 may obtain the following historical weather metrics for a particular period (e.g., for the past four years): timestamps (e.g., GMT timestamps) associated with various weather events, location identifiers (e.g., zip code identifiers and/or GPS identifiers) associated with various weather events, temperature identifiers associated with various weather events, wind speed metrics associated with various weather events, wind direction metrics associated with various weather events, cloud coverage metrics associated with various weather events, precipitations type identifiers associated with various weather events, precipitation volume metrics associated with various weather events, tidal information associated with various weather events, sunrise time identifiers associated with various weather events, sunset time identifiers associated with various weather events, lunar orbit identifiers associated with various weather events, solar event metrics (e.g., solar flare metrics and/or solar dark spot counts) associated with various weather events, etc.

At step/operation 902, the predictive data analysis computing entity 106 determines property damage claim predictions based on the periodic weather data obtained in step/operation 901. In some embodiments, the predictive data analysis computing entity 106 applies a machine learning model to the periodic weather data to generate property damage claim predictions, where the machine learning model is configured to process periodic weather data for a particular locational unit and temporal unit in order to generate a property damage claim predictions.

At steps/operations 903A-D, the predictive data analysis computing entity 106 performs various prediction-based actions based on the property damage claim predictions. For example, at step/operation 903A, the predictive data analysis computing entity 106 populates a Choropleth map to show claim density and knowledge of where claims will originate from. At step/operation 903B, the predictive data analysis computing entity 106 populates a chart to show top types of property damage and associated projected total costs. At step/operation 903C, the predictive data analysis computing entity 106 transmits preventive notifications to policy holders that will be impacted, where the notifications may include information about preventative measures to take. At step/operation 903D, the predictive data analysis computing entity 106 enforces a load balancing policy for service centers based on the property damage claim predictions. For example, the predictive data analysis computing entity 106 may forward service communications (e.g., service calls) to particular call centers to balance operational load on various service centers. As another example, the predictive data analysis computing entity 106 may forward service communications from areas predicted to experience particular types of claims to subject matter expert technicians deemed best capable to address issues associated with the particular types of claims.

FIG. 10 is a flowchart diagram of an example process 1000 for generating a predicted inquiry quantity for a particular location. Via the various steps/operations of process 1000, the predictive data analysis computing entity 106 can predict operational load on particular service centers, which in turn can assist in generating and enforcing particular load balancing policies for the particular service centers.

The process 1000 begins at step/operation 1001 when the predictive data analysis computing entity 106 receives a desired location. The desired location can be received from a user or from a program. The desired location can be of different types and/or sizes. For example, the desired location can be a city, a county, a state, or regions of other sizes. Alternatively, a plurality of areas (locations) can be received. Although in some embodiments, it is contemplated that a user enters a location into a user interface and then receives ultimately a predicted damage estimate or a predicted inquiry volume for the entered location, in other embodiments, one or more locations may have been previously entered into a program by another program or a user and the receiving is done by a computing device performing the below described generating without user input. In other words, the predictive data analysis computing entity 106 receives a plurality of locations from another computer entity and then generates predictions on a predetermined basis. For example, in one embodiment, the predictive data analysis computing entity 106 generates predictions for all locations stored in transitory and/or non-transitory memory.

At step/operation 1002, the predictive data analysis computing entity 106 obtains historical weather data for the received desired location. At step/operation 1003, the predictive data analysis computing entity 106 obtains historical weather damage data for the received desired location. At step/operation 1004, the predictive data analysis computing entity 106 obtains weather forecast data regarding the received desired location. Although in one exemplary embodiment, the desired location is entered in by a user and the computing entity receives current weather forecast data and then accesses historical data to generate predictions using the current data (e.g. the received location and weather forecast) and the historical data, in other embodiments, both location data and the weather forecast is not received real-time but rather retrieved from a data storage, and therefore the terms receiving and accessing are used herein interchangeably to indicate that data is provided or is being provided. At step/operation 1005, the predictive data analysis computing entity 106 generates a predicted damage estimate for the received desired location based at least on the historical weather data, the historical weather damage data, and the weather forecast data. At step/operation 1006, the predictive data analysis computing entity 106 generates a predicted inquiry volume for the received desired location based at least partially on the predicted damage estimate.

The predicted inquiry volume may be utilized to perform one or more load balancing actions for a service center. For example, given a predicted inquiry volume indicating high call volumes from a particular region, the predictive data analysis computing entity 106 may direct a portion of the calls from the particular region to call centers not affiliated with the particular region to reduce the expected operational load on the call centers affiliated with the particular region. As another example, given a predicted inquiry volume indicating high call volumes related to a particular claim type from a particular region, the predictive data analysis computing entity 106 may direct calls from the particular region to particular service centers deemed to have particular areas of expertise so as to best serve expected needs of relevant service seekers.

FIG. 11 is a flowchart diagram of an example process 1100 for generating an updated property damage prediction model using real-time property damage feedback. Via the various steps/operations of process 1100, the predictive data analysis computing entity 106 can generate predictions using a first prediction model and update the prediction model based on real-time property damage feedback in accordance with a real-time property damage feedback loop.

The process 1100 begins at step/operation 1101 when the predictive data analysis computing entity 106 obtains historical inquiry volume data. At step/operation 1102, the predictive data analysis computing entity 106 correlates the historical inquiry volume data with historical weather damage data. At step/operation 1103, the predictive data analysis computing entity 106 obtains planetary data and solar data. At step/operation 1104, the predictive data analysis computing entity 106 generates a predicted damage estimate for a received desired location based at least on the historical weather data, the historical weather damage data, the weather forecast data, the planetary data, and the solar data. At step/operation 1105, the predictive data analysis computing entity 106 generates damage notifications based on the predicted damage estimate for the received desired location. In some embodiments, the predictive data analysis computing entity 106 utilizes the predicted damage estimate to notify at least one insurance policy holder when the predicted damage estimate for a respective structure of the insurance policy holder meets a defined condition.

At step/operation 1106, the predictive data analysis computing entity 106 generates a first learning estimate based on the predicted damage estimate. In some embodiments, the predictive data analysis computing entity 106 records the predicted damage estimate as a learning estimate, where the predicted damage estimate was generated using a first prediction model. At step/operation 1107, the predictive data analysis computing entity 106 generates the updated property damage prediction model. In some embodiments, the predictive data analysis computing entity 106 receives an actual damage report for the received desired location and generates a second prediction model by applying a machine learning algorithm to the learning estimate and the actual damage report.

The updated property damage prediction may be utilized to perform a range of prediction-based actions. For example, the predictive data analysis computing entity 106 may issue danger notifications to particular property owners in response to detecting that the updated property damage prediction for particular properties exceed threshold values. As another example, the predictive data analysis computing entity 106 may issue statistics about historic and/or geographic trends in updated predicted property damage predictions. As a further example, the predictive data analysis computing entity 106 may utilize updated predicted property damage predictions to enforce load balancing policies on various call centers to ensure smooth operational load on the various call centers.

Trend-Based Predictive Modeling with Temporally Dynamic Techniques

FIG. 12 is an operational example 1200 of trend-based predictive modeling with temporally dynamic techniques. As depicted in the operational example 1200, positive training data (e.g., data indicating presence of desired predictive attributes) for various temporally distinct intervals (e.g., various years) will be provided as an input to a trend-based predictive data analysis module configured to detect various statistical properties of the positive training data. In the operational example 1200, statistical drift of the training data over time can provide insights about direction of evolution of data over time.

FIG. 13 is an operational example 1300 of a system for performing temporally dynamic predictive inferences. As depicted in the operational example 1300, historic positive training data and historic negative training data (e.g., historic data indicating absence of desired predictive attributes) for various distinct temporal intervals as well as recent validation data are used to train and validate various machine learning models. In particular, each machine learning model is trained using historic positive training data and historic negative training data for a distinct temporal interval. Then, the trained machine learning model is validated using recent validation data to determine a delta (e.g., a validation result). Thereafter, the trained machine learning model having the highest delta is selected as an optimal machine learning model. In some embodiments, steps/operations similar to those depicted in the operational example 1300 may be performed for a subset of prediction space, for example a subset related to a particular time interval and/or a particular region.

FIG. 14 provides an operational example 1400 of weather data. As depicted in the operational example 1400, each weather event is associated with associated locational and climate-related attributes, some of which are represented as innumerable-type values. Moreover, FIG. 15 provides an operational example 1500 of claim data. As depicted in the operational example 1500, each claim data entry is associated with locational and property-descriptor attributes, some of which are also represented as innumerable-type values. Together, weather data and claim data provide powerful inputs for a forecast-based prediction system.

For example, some embodiments of the present invention may provide for forecast driven predictions. More specifically, and in accordance with some exemplary embodiments, predictions such as regarding an anticipated call volume can be generated based upon forecasts of related events. For example, property damage typically occurs during and after severe weather. And therefore, a forecast of severe weather can drive predictions regarding call volume about weather-related property losses. Herein described are concepts that provide an ability to continuously and efficiently forecast property damage and/or the resultant insurance claim inquires. In other words, the property damage forecasts facilitate a business, such as an insurance company, for example, to help prepare for increased call volume loads expected during or after severe weather. Additionally, the property damage forecasts enable the company to better prepare for property damage claims resulting from forecasted catastrophes that may make desirable the creation of emergency locations (e.g., help kiosks) by enabling the company to better estimate the number and location(s) of such kiosks. Additionally, the property damage forecasts allow for prepared production software services to be aligned to volume call needs. For example, software modules related to water flooded cars can be preemptively queued to facilitate more instances running than under normal conditions. Or software services can be partially modified to be more specific to a particular forecasted severe weather event. Moreover, policy holders may be helped by sending notifications on preventative measures the policy holders can perform to reduce risk during the forecasted event. In other words, after the property damage forecast is made, the forecast can be utilized to give specific information to policy holders before the event and for predicting call volume during and after the forecasted adverse weather event.

Also, because weather is localized the concepts disclosed herein can provide localized predictions. Additionally, a plurality of localized predictions can be combined to provide regional or even global estimates of events, such as, for example, but not limited to inquiry volume. With respect to insurance companies and insured policy holders, most if not all original contacts involving weather related property damage currently occurs when a policy holder calls (initiates a telephone call to) an insurance company's call center(s). However, it is contemplated that the benefits of embodiments of the present invention accrue to any and all contacts initiated in response to a storm or other weather event causing damage and therefore the term "inquiry" is used herein to refer to all inquiries such as traditional phone calls, text messaging (SMS and MMS), emails, interaction via a web page, non-traditional phone calls (Voice Over Internet Protocol (VOIP)) as well as yet to be developed modalities capable of conveying an inquiry. In other words, although at least one embodiment herein described provides predicting the number of expected inquires resultant to a storm or tornado or other weather event; the manner in which the inquiries are capable of being made do not affect the predictive value of the forecast driven predictions herein enabled. Additionally, the inquiry can be in person. For example, when the forecasted weather event is large and damage is accordingly expected to be large, the insurer can set up temporary sites at which people can physically arrive at and inquire to best obtain claim service (help kiosks). Because of the personal service enabled at these emergency locations and the desire to staff the locations appropriately, the term "inquiry volume" includes in-person visits to emergency locations in some embodiments. Although users (e.g., human policy holders) call companies such as insurance companies in response to weather related damage and together (in aggregate form) constitute the "call volume" (e.g., "inquiry volume") and typically at some point in the call, another person (say an agent) will interact with the caller, most, if not all, of the herein described methods and apparatus are machine employable with little or no human interaction. For example, in one particular embodiment, historical weather data, planetary data, and solar data are combined with historical property damage data for a given location on the earth and a machine learning algorithms are trained to generate a machine learning model. The machine learning model can be used by a software service and with weather forecasts for all locations where historical policy and property damage data has been recorded.

Using the historical weather data, planetary data, and solar data combined with historical property damage data from locations where historical policy and property damage have been recorded, a property damage forecast can be created which can then be used to automatically generate a forecast of call volume loads and the locations where the calls are predicted to originate from. In addition to the immediately prior described automated embodiment, a manual embodiment is also herein provided wherein after the property damage forecast is created, and the property damage forecast is then aggregated into visual and/or tabular charts to assist users to forecast call volume loads and the locations from where the calls (inquires) are predicted to originate. In one exemplary embodiment, a choropleth map is generated that facilitates users in visualizing areas and their respective predicted weather severity and/or their respective call volume intensity. Additionally, the property damage forecast can be used to facilitate the forecasting of loads on the production environments. The property damage forecast can be used to facilitate the communication to policy holders of any preventative measure(s) the policy holders can take to prepare for that particular weather event.

In other words, when a particular event such as a hurricane is forecasted for a definite area, the policy holders in that area can be provided hurricane-specific advice.

V. CONCLUSION

Many modifications and other embodiments will come to mind to one skilled in the art to which this disclosure pertains having the benefit of the teachings presented in the foregoing descriptions and the associated drawings. Therefore, it is to be understood that the disclosure is not to be limited to the specific embodiments disclosed and that modifications and other embodiments are intended to be included within the scope of the appended claims. Although specific terms are employed herein, they are used in a generic and descriptive sense only and not for purposes of limitation.

The invention claimed is:

1. A computer-implemented method for generating a temporally dynamic prediction for a prediction input, the computer-implemented method comprising:
   processing the prediction input, using each temporally trained machine learning model of a plurality of temporally trained machine learning models, to generate a respective model-specific prediction inference of a plurality of model-specific prediction inferences, wherein: (i) each temporally trained machine learning model is associated with a temporal unit, (ii) each temporal unit comprises one or more time intervals, and (iii) each temporally trained machine learning model is trained using (a) one or more temporally distinct historical weather data entries and (b) historical claim data as training data entries associated with temporal unit;
   processing the plurality of model-specific prediction inferences, using an ensemble model, to generate the temporally dynamic prediction for the prediction input, wherein the temporally dynamic prediction comprises at least one of a property damage claim prediction or a service center operational load prediction; and
   in response to generating the temporally dynamic prediction comprising the at least one of the property damage claim prediction or the service center operational load prediction, automatically performing, using at least a processor,
      forwarding at least one call directed to one or more service center devices to another service center device.

2. The computer-implemented method of claim 1, wherein the ensemble model is configured to:
   identify a selected temporally trained machine learning model of the plurality of temporally trained machine learning models, wherein: (i) each temporally trained machine learning model of the plurality of temporally trained machine learning models is associated with a validation score, (ii) the validation score for each temporally trained machine learning model of the plurality of temporally trained machine learning models is determined based on one or more validation data entries, and (iii) the selected temporally trained machine learning model is selected based on the validation score for the selected temporally trained machine learning model.

3. The computer-implemented method of claim 2, wherein the one or more validation data entries comprise one or more real-time data entries.

4. The computer-implemented method of claim 2, wherein the one or more validation data entries comprise one or more recent data entries.

5. The computer-implemented method of claim 1, wherein the ensemble model is trained using one or more real-time training data entries.

6. The computer-implemented method of claim 1, wherein the temporally dynamic prediction comprises at least the service center operational load prediction, and in response to generating the temporally dynamic prediction comprising at least the service center operational load prediction, the computer-implemented method further comprises forwarding the at least one call directed to one or more service center devices to another service center device responsive to the service center operation load prediction.

7. An apparatus for generating a temporally dynamic prediction for a prediction input, the apparatus comprising at least one processor and at least one non-transitory memory comprising program code, wherein the at least one non-transitory memory and the program code are configured to, with the at least one processor, cause the apparatus to:
   process the prediction input using each temporally trained machine learning model of a plurality of temporally trained machine learning models to generate a respective model-specific prediction inference of a plurality of model-specific prediction inferences, wherein: (i) each temporally trained machine learning model is associated with a temporal unit, (ii) each temporal unit comprises one or more time intervals, and (iii) each temporally trained machine learning model is trained using (a) one or more temporally distinct historical weather data entries and (b) historical claim data as training data entries associated with temporal unit;
   process the plurality of model-specific prediction inferences using an ensemble model to generate the temporally dynamic prediction for the prediction input, wherein the temporally dynamic prediction comprises at least one of a property damage claim prediction or a service center operational load prediction; and
   in response to generating the temporally dynamic prediction comprising the at least one of the property damage claim prediction or the service center operational load prediction automatically performing, using the at least one processor,
      forwarding at least one call directed to one or more service center devices to another service center device.

8. The apparatus of claim 7, wherein the ensemble model is configured to:
   identify a selected temporally trained machine learning model of the plurality of temporally trained machine learning models, wherein: (i) each temporally trained machine learning model of the plurality of temporally trained machine learning models is associated with a validation score, (ii) the validation score for each temporally trained machine learning model of the plurality of temporally trained machine learning models is determined based on one or more validation data entries, and (iii) the selected temporally trained machine learning model is selected based on the validation score for the selected temporally trained machine learning model.

9. The apparatus of claim 7, wherein the ensemble model is trained using one or more real-time training data entries.

10. The apparatus of claim 7, wherein forwarding the at least one call comprises enforcing a load balancing policy on one or more communication systems associated with one or more service centers based on the temporally dynamic prediction.

11. A non-transitory computer storage medium comprising instructions for generating a temporally dynamic predicition for a prediciton input, the instructions configured to cause one or more processors to at least at least perform:

process the prediction input using each temporally trained machine learning model of a plurality of temporally trained machine learning models to generate a respective model-specific prediction inference of a plurality of model-specific prediction inferences, wherein: (i) each temporally trained machine learning model is associated with a temporal unit, (ii) each temporal unit comprises one or more time intervals, and (iii) each temporally trained machine learning model is trained using (a) one or more temporally distinct historical weather data entries and (b) historical claim data as training data entries associated with the temporal unit;

process the plurality of model-specific prediction inferences using an ensemble model to generate the temporally dynamic prediction for the prediction input, wherein the temporally dynamic prediction comprises at least one of a property damage claim prediction or a service center operational load prediction; and in response to generating the temporally dynamic prediction comprising the at least one of the property damage claim prediction or the service center operational load prediction, automatically performing, using the one or more processors, forwarding at least one call directed to one or more service center devices to another service center device.

12. The non-transitory computer storage medium of claim 11, wherein the ensemble model is configured to:

identify a selected temporally trained machine learning model of the plurality of temporally trained machine learning models, wherein: (i) each temporally trained machine learning model of the plurality of temporally trained machine learning models is associated with a validation score, (ii) the validation score for each temporally trained machine learning model of the plurality of temporally trained machine learning models is determined based on one or more validation data entries, and (iii) the selected temporally trained machine learning model is selected based on the validation score for the selected temporally trained machine learning model.

13. The non-transitory computer storage medium of claim 11, wherein the ensemble model is trained using one or more real-time training data entries.

\* \* \* \* \*

UNITED STATES PATENT AND TRADEMARK OFFICE
CERTIFICATE OF CORRECTION

PATENT NO.        : 11,922,284 B1
APPLICATION NO.   : 16/446767
DATED             : March 5, 2024
INVENTOR(S)       : Timothy Jonathan Pirozzi et al.

It is certified that error appears in the above-identified patent and that said Letters Patent is hereby corrected as shown below:

In the Claims

In Column 29, Lines 5-6, Claim 11, delete "dynamic predicition for a predicition input," and insert -- dynamic prediction for a prediction input, --, therefor.

Signed and Sealed this
Fifth Day of November, 2024

Katherine Kelly Vidal
*Director of the United States Patent and Trademark Office*